(12) United States Patent
Miyamoto

(10) Patent No.: US 8,432,587 B2
(45) Date of Patent: Apr. 30, 2013

(54) LINE PRINTING DEVICE AND METHOD PERFORMING COLOR CONVERSION AND HALFTONING ON IMAGE DATA SUBJECTED TO CORRECTION BASED ON CORRECTION VECTORS ASSOCIATED WITH A PIXEL ROW AND REFERENCE COLOR

(75) Inventor: Toru Miyamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 266 days.

(21) Appl. No.: 13/045,837

(22) Filed: Mar. 11, 2011

(65) Prior Publication Data
US 2011/0235126 A1 Sep. 29, 2011

(30) Foreign Application Priority Data
Mar. 24, 2010 (JP) .................................. 2010-068669

(51) Int. Cl.
*H04N 1/58* (2006.01)
*H04N 1/60* (2006.01)

(52) U.S. Cl.
USPC ........... 358/518; 358/520; 358/540; 358/3.26

(58) Field of Classification Search .................. 358/518, 358/521, 532, 540, 504, 3.26; 382/162, 167, 382/275
See application file for complete search history.

(56) References Cited

U.S. PATENT DOCUMENTS

| 6,611,357 B2 * | 8/2003 | Wendt et al. .................... 358/1.9 |
| 8,305,665 B2 * | 11/2012 | Sakamoto et al. ............. 358/518 |
| 2005/0185012 A1 | 8/2005 | Yoshida |
| 2012/0200627 A1 * | 8/2012 | Arazaki .......................... 347/15 |

FOREIGN PATENT DOCUMENTS

JP 2005-205691 A 8/2005

* cited by examiner

*Primary Examiner* — Scott A Rogers
(74) *Attorney, Agent, or Firm* — Global IP Counselors, LLP

(57) ABSTRACT

For each of a plurality of reference colors located at prescribed coordinates in a first color space (e.g., the RGB color space), there are associated, on an individual pixel row basis, correction vectors indicating correction amounts in the first color space. For each pixel datum of image data of first tone values (e.g., 256 tone values) of the first color space prior to a color conversion process, a correction process is carried out on the basis of the correction vector that has been associated with the pixel row to which a given pixel belongs, the correction vector also being associated with the reference color of a location surrounding the coordinates that indicate the pixel data in the first color space. The color conversion process and the halftoning process are carried out on image data composed of the pixel data that has been subjected to the correction process.

6 Claims, 21 Drawing Sheets

| Pixel Row Number | Tone Value | | | | |
|---|---|---|---|---|---|
| | Ca(=179) | Cb(=153) | Cc(=128) | Cd(=102) | Ce(=76) |
| 1 | $\Delta Ca\_1$ | $\Delta Cb\_1$ | $\Delta Cc\_1$ | $\Delta Cd\_1$ | $\Delta Ce\_1$ |
| 2 | $\Delta Ca\_2$ | $\Delta Cb\_2$ | $\Delta Cc\_2$ | $\Delta Cd\_2$ | $\Delta Ce\_2$ |
| 3 | $\Delta Ca\_3$ | $\Delta Cb\_3$ | $\Delta Cc\_3$ | $\Delta Cd\_3$ | $\Delta Ce\_3$ |
| ⋮ | ⋮ | ⋮ | ⋮ | ⋮ | ⋮ |
| j | $\Delta Ca\_j$ | $\Delta Cb\_j$ | $\Delta Cc\_j$ | $\Delta Cd\_j$ | $\Delta Ce\_j$ |
| ⋮ | ⋮ | ⋮ | ⋮ | ⋮ | ⋮ |
| 23 | $\Delta Ca\_23$ | $\Delta Cb\_23$ | $\Delta Cc\_23$ | $\Delta Cd\_23$ | $\Delta Ce\_23$ |
| 24 | $\Delta Ca\_24$ | $\Delta Cb\_24$ | $\Delta Cc\_24$ | $\Delta Cd\_24$ | $\Delta Ce\_24$ |

Fig. 13

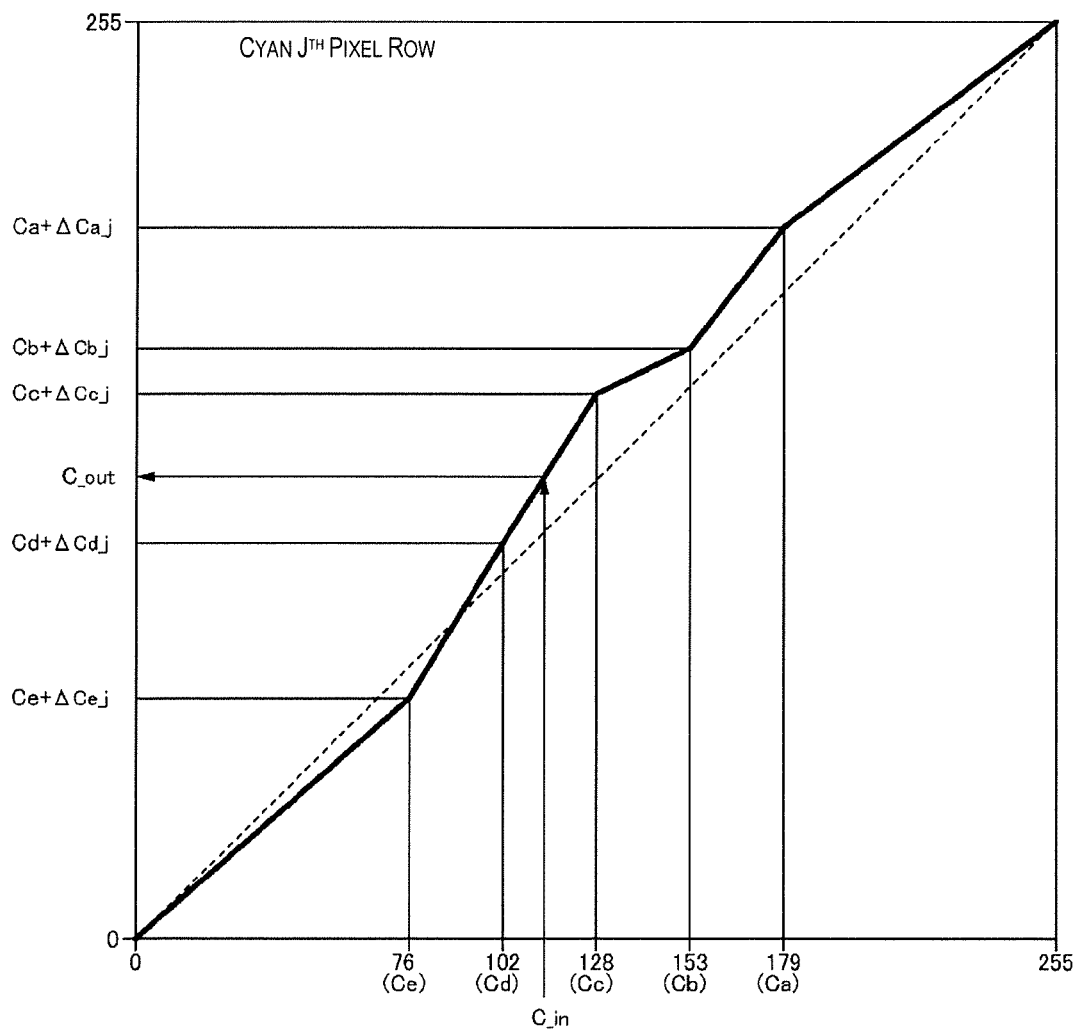

M Pixels (24 Pixels): pixels numbered 1 through 27, with pixel 1 shown as ×1 reference.

Fig. 18B CORRECTION PATTERN PIXEL DATA (INPUT RGB VALUES)

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| r | 255 | 128 | 0 | 255 | 128 | 0 | 255 | 128 | 0 | 255 | 128 | 0 | 255 | 128 | 0 | 255 | 128 | 0 | 255 | 128 | 0 | 255 | 128 | 0 | 255 | 128 | 0 |
| g | 255 | 255 | 255 | 128 | 128 | 128 | 0 | 0 | 0 | 255 | 255 | 255 | 128 | 128 | 128 | 0 | 0 | 0 | 255 | 255 | 255 | 128 | 128 | 128 | 0 | 0 | 0 |
| b | 255 | 255 | 255 | 255 | 255 | 255 | 255 | 255 | 255 | 128 | 128 | 128 | 128 | 128 | 128 | 128 | 128 | 128 | 0 | 0 | 0 | 0 | 0 | 0 | 0 | 0 | 0 |

Fig. 18C SCANNED TONE VALUES OF J$^{TH}$ PIXEL ROW (OUTPUT RGB VALUES)

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| R | 243 | 114 | 98 | 207 | 136 | 117 | 180 | 114 | 91 | 231 | 113 | 113 | 219 | 131 | 75 | 177 | 119 | 70 | 225 | 114 | 99 | 214 | 126 | 74 | 198 | 103 | 62 |
| G | 243 | 172 | 156 | 148 | 149 | 141 | 89 | 110 | 107 | 213 | 159 | 158 | 140 | 122 | 100 | 86 | 80 | 74 | 204 | 157 | 141 | 132 | 123 | 94 | 98 | 75 | 61 |
| B | 237 | 203 | 214 | 182 | 199 | 195 | 121 | 162 | 162 | 90 | 119 | 116 | 123 | 115 | 108 | 94 | 93 | 89 | 69 | 111 | 97 | 74 | 69 | 78 | 82 | 72 | 64 |

$\Delta R14 = \{ P13(r13,g13,b13) - P15(r15,g15,b15) \} / (r13-r15)$ $= \{ (R13,G13,B13) - (R15,G15,B15) \} / 255$ $\Delta G14 = \{ P11(r11,g11,b11) - P17(r17,g17,b17) \} / (g11-g17)$ $= \{ (R11,G11,B11) - (R17,G17,B17) \} / 255$ $\Delta B14 = \{ P5(r5,g5,b5) - P23(r23,g23,b23) \} / (b5-b23)$ $= \{ (R5,G5,B5) - (R23,G23,B23) \} / 255$ $\Delta R15 = \{ P14(r14,g14,b14) - P15(r15,g15,b15) \} / (r14-r15)$ $= \{ (R14,G14,B14) - (R15,G15,B15) \} / 128$ $\Delta G17 = \{ P14(r14,g14,b14) - P17(r17,g17,b17) \} / (g14-g17)$ $= \{ (R14,G14,B14) - (R17,G17,B17) \} / 128$ $\Delta B23 = \{ P14(r14,g14,b14) - P23(r23,g23,b23) \} / (b14-b23)$ $= \{ (R14,G14,B14) - (R23,G23,B23) \} / 128$

LINE PRINTING DEVICE AND METHOD PERFORMING COLOR CONVERSION AND HALFTONING ON IMAGE DATA SUBJECTED TO CORRECTION BASED ON CORRECTION VECTORS ASSOCIATED WITH A PIXEL ROW AND REFERENCE COLOR

CROSS-REFERENCE TO RELATED APPLICATIONS

This application claims priority to Japanese Patent Application No. 2010-068669 filed on Mar. 24, 2010. The entire disclosure of Japanese Patent Application No. 2010-068669 is hereby incorporated herein by reference.

BACKGROUND

1. Technical Field

The present invention relates to a printing device and to a printing method.

2. Related Art

Printing devices that employ an inkjet system whereby printing onto a medium (such as paper, fabric, or OHP transparency film) is carried out by expelling ink from a head on which a multitude of nozzles are arrayed are known in the art. Known printing devices of this kind include line printers, in which the medium is fed with respect to a stationary head; and serial printers, in which an operation of moving the head while expelling ink and an operation of feeding the medium are repeated in alternating fashion. Known systems for expelling ink from the head include piezoelectric systems employing piezoelectric elements such as piezo elements, and thermal systems that employ a heater to create bubbles.

In inkjet system printing devices, dots are formed on a medium by ink that has landed on the medium, to effect printing onto the medium of an image (printed image) composed of a multitude of these dots. In some instances, streak-like density unevenness may occur in printed images. It is thought that such density unevenness is caused by failure of the multitude of dot rows making up a printed image from being formed in ideal fashion due to the effects of manufacturing errors of the heads, so that individual dot rows are darker or lighter depending on dot size, or the dot rows are formed out of alignment.

Density unevenness correction technologies like that disclosed in Japanese Laid-Open Patent Application 2005-205691, for example, are known methods for reducing such density unevenness.

SUMMARY

According to Japanese Laid-Open Patent Application 2005-205691, density unevenness in images of each of the colors of a color space composed of the same colors as the inks (cyan, magenta, yellow, and black) is corrected on an individual basis. The assumption is that if density unevenness of the individual colors (single-color unevenness) of a color space containing the same colors as the ink can be suppressed, density unevenness in the printed image composed of these superimposed colors can be suppressed as well.

However, there are instances in which, notwithstanding successful respective correction of density unevenness of images of the colors of the same color space as the ink colors, unevenness (mixed-color unevenness) arises in the printed image composed of these multiple superimposed colors.

An object of the present invention is to reduce unevenness in printed images composed of multiple superimposed colors.

A printing method according to a first aspect of the present invention includes: carrying out a color conversion process whereby image data of a first color space configured using a plurality of juxtaposed pixel rows made of a plurality of pixels lined up in a prescribed direction, the image data being of first tone values more numerous than tones capable of being reproduced by a printing device, is converted into image data of the first tone values of a second color space that corresponds to ink colors of the printing device; carrying out a halftoning process for converting image data of the first tone values subsequent to the color conversion process into image data of second tone values that are tones capable of being reproduced by the printing device; and forming dot rows on a medium on the basis of a plurality of pixel data values in the pixel rows of the image data subsequent to the halftoning process, thereby prompting the printing device, on the basis of the image data, to form a plurality of juxtaposed dot rows and form a printed image on the medium. Moreover, the printing method also includes: associating, on an individual pixel row basis, a correction vector indicating a correction amount in the first color space for each of a plurality of reference colors located at prescribed coordinates in the first color space; carrying out a correction process for each pixel datum of image data of the first tone values of the first color space prior to the color conversion process, on the basis of the correction vector that has been associated with the pixel row to which a given pixel belongs, the correction vector also being associated with the reference color of a location surrounding the coordinates indicating the pixel data in the first color space; and carrying out the color conversion process and the halftoning process on image data configured from the pixel data that has been subjected to the correction process.

These and other features of the present invention will become apparent from a consideration of the disclosure of the specification and the accompanying drawings.

BRIEF DESCRIPTION OF THE DRAWINGS

Referring now to the attached drawings which form a part of this original disclosure:

FIG. 13 is an illustration of a single-color unevenness correction value table;

FIG. 14 is an illustration of a single-color unevenness correction process for tone values of pixel data;

FIG. 18A is an illustration of image data of a test pattern for acquisition of a mixed-color unevenness correction values, FIG. 18B is a table showing tone values of 27 correction patterns of a test pattern, and FIG. 18C is an illustration of output RGB values of the j-th pixel row;

DETAILED DESCRIPTION OF EXEMPLARY EMBODIMENTS

Figure 1:
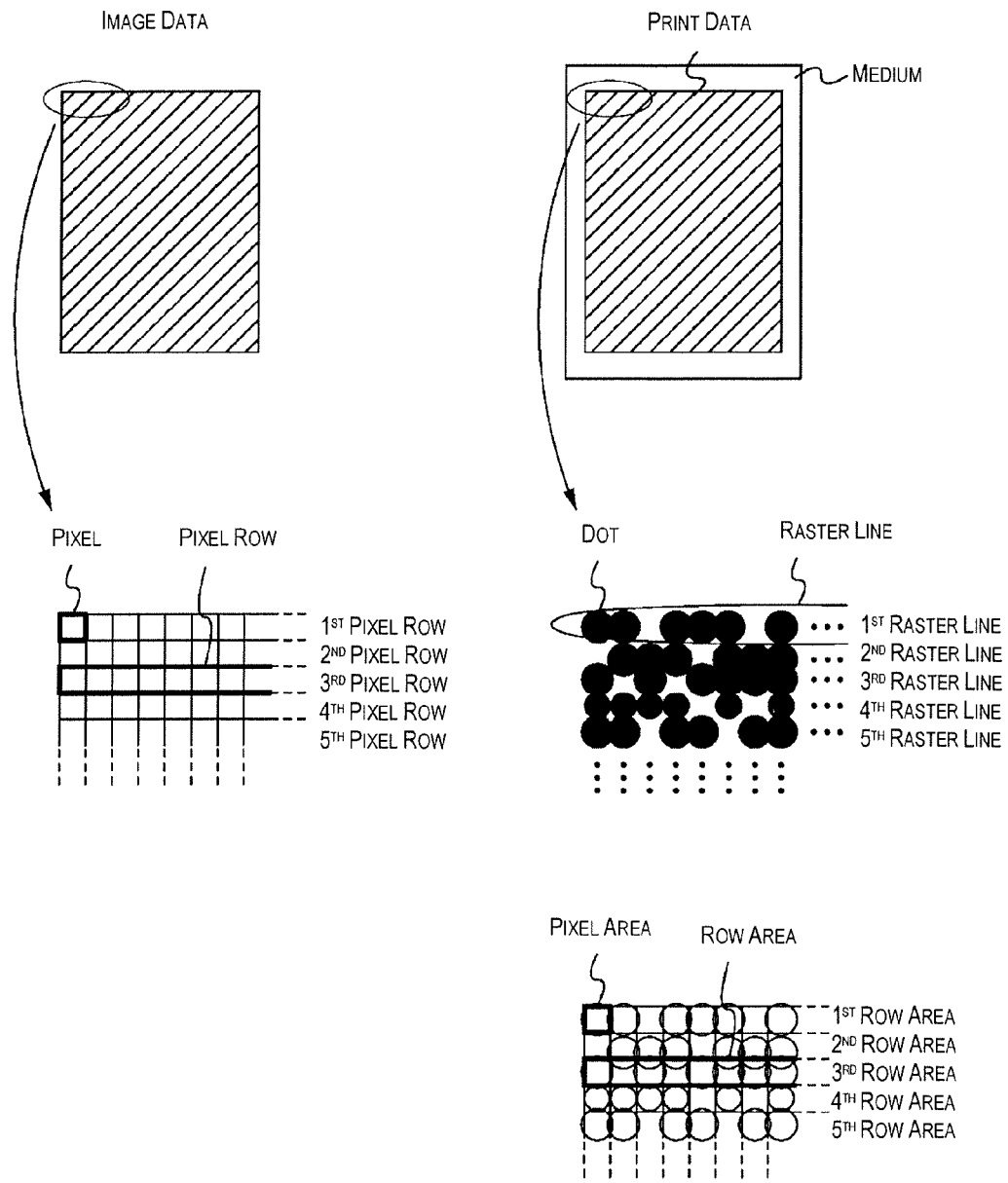
FIG. 1 is an illustration of terminology.

At a minimum, the following will be apparent from the specification and the accompanying drawings.

A printing method according to the embodiment includes: carrying out a color conversion process whereby image data of a first color space configured using a plurality of juxtaposed pixel rows made of a plurality of pixels lined up in a prescribed direction, the image data being of first tone values more numerous than tones capable of being reproduced by a printing device, is converted into image data of the first tone values of a second color space that corresponds to ink colors of the printing device; carrying out a halftoning process for converting image data of the first tone values subsequent to the color conversion process into image data of second tone values that are tones capable of being reproduced by the printing device; and forming dot rows on a medium on the basis of a plurality of pixel data values in the pixel rows of the image data subsequent to the halftoning process, thereby prompting the printing device, on the basis of the image data, to form a plurality of juxtaposed dot rows and form a printed image on the medium; wherein the printing method is characterized in further including associating, on an individual pixel row basis, a correction vector indicating a correction amount in the first color space for each of a plurality of reference colors located at prescribed coordinates in the first color space; carrying out a correction process for each pixel datum of image data of the first tone values of the first color space prior to the color conversion process, on the basis of the correction vector that has been associated with the pixel row to which a given pixel belongs, the correction vector also being associated with the reference color of a location surrounding the coordinates indicating the pixel data in the first color space; and carrying out the color conversion process and the halftoning process on image data configured from the pixel data that has been subjected to the correction process.

According to this printing process, unevenness is suppressed in printed images that are composed of a plurality of ink colors that are superimposed.

Preferably, the method further includes: forming a printed image of a test pattern on a medium on the basis of image data of the first tone values of the first color space of the test pattern, the test pattern being made of a plurality of correction patterns that respectively correspond to the plurality of reference colors; scanning the printed image of the test pattern, whereby scanned image data of the first color space is acquired; and acquiring the correction vectors on an individual pixel row basis for each of the plurality of reference colors, based on the scanned image data. Correction vectors may be acquired thereby.

Preferably, the method further includes: during computation of the correction vectors on an individual pixel row basis for each of the plurality of reference colors based on the scanned image data, computing output tone values of the first color space for each of the plurality of reference colors on an individual pixel row basis; computing, based on the output tone value, an amount of change in the output tone value, observed when an input tone value corresponding to the reference color has changed by a unit amount; and computing as the correction vector, based on the amount of change, a correction amount to the input tone value, such that the output tone value with respect to the input tone value becomes a target value. Correction vectors may be computed thereby.

Preferably, the method further includes: associating a correction value for the individual ink colors on an individual pixel row basis; carrying out a single-color correction process on each pixel datum of image data of the first tone values in the second color space subsequent to the color conversion process, for each of the individual ink colors, on the basis of the correction value associated with the pixel row to which the given pixel belongs; and carrying out the halftoning process on image data of the first tone values in the second color space subsequent to the single-color correction process. Separate correction of single-color unevenness and mixed-color unevenness is possible thereby.

Preferably, the method further includes: (A) prior to acquisition of the correction vectors, printing onto a medium a single-color correction process test pattern made of a plurality of correction patterns respectively corresponding to the ink colors; scanning the printed image of the single-color correction process test pattern, whereby scanned image data is acquired; computing, on the basis of the scanned data of the single-color correction process test pattern, a density of each of the pixel rows; and acquiring the correction values for single-color correction on the basis of the density computed for each of the pixel rows; (B) after the correction values for said single-color correction have been acquired, carrying out the color conversion process, the single-color correction process, and the halftoning process on image data of the first tone values of the first color space of a test pattern made of a plurality of correction patterns respectively corresponding to the plurality of reference colors; forming a printed image of the test pattern on a medium; scanning the printed image of the test pattern, whereby scanned image data of the first color space is acquired; and acquiring the correction vectors on the basis of the scanned image data; and (C) after the correction vectors have been acquired, carrying out the correction process based on the correction vectors, on image data of first tone values of the first color space of the image to be printed out; and carrying out the color conversion process and the halftoning process on image data configured from the pixel data that has been subjected to the correction process.

DESCRIPTION OF TERMINOLOGY

The discussion turns first to the meanings of the terminology used when describing the embodiment.

FIG. 1 is an illustration of terminology.

"Printed image" refers to an image printed out onto paper. Printed images from an inkjet printer are composed of a multitude of dots formed on the paper.

"Raster line" refers to a line of dots lined up in the direction of relative motion (travel direction) of the head and the paper. In the case of a line printer, as in the embodiment described below, a raster line means a line of dots lined up in the paper feed direction (in the case of a serial printer that effects printing by a head carried on a carriage, a raster line means a line of dots lined up in the direction of travel of the carriage). A printed image may be composed through juxtaposition of a multitude of raster lines in the direction perpendicular to the travel direction. As shown in the drawings, a raster line at an n-th location is denoted as the "n-th raster line."

"Image data" refers to data representing a two-dimensional image. In the embodiment described later it involves RGB color space image data, CMYK color space image data, and the like. Image data of the respective colors of the RGB color space is referred to respectively as "R image data", "G image data", and "B image data." Image data of the respective colors of the CMYK color space is referred to respectively as "C image data", "M image data", "Y image data", and "K image data." 256-tone image data and 4-tone image data are a few types of image data. Where a printer produces dots in four different tones (large dot, medium dot, small dot, and no dot), 4-tone image data of the CMYK color space represents formation states of dots that make up a printed image, and for this reason 4-tone image data of the CMYK color space in particular is sometimes referred to as "printed image data." Image data that has been scanned with a scanner is sometimes referred to as "scanned image data."

A "pixel" is the smallest unit that makes up an image. Images are composed by two-dimensional placement of these pixels. The term is primarily used to refer to pixels in terms of image data.

A "pixel row" is a line of pixels in image data, which are lined up in a prescribed direction. As shown in the drawings, a pixel row at an n-th location is denoted as the "n-th pixel row." Images represented by image data are composed of a plurality of juxtaposed pixel rows.

"Pixel data" is data that represents tone values of pixels. Image data is composed of a multitude of pixel data values. These pixel data values are sometimes also called "pixel tone values." In the embodiment hereinbelow, the individual pixel data values of printed image data indicate dot formation states (large dot, medium dot, small dot, no dot) of given pixels.

"Pixel row data" is pixel data of a plurality of pixels contained in a pixel row. A raster line of a printed image is produced by forming on a medium a plurality of dots in accordance with the pixel row data of printed image data. Pixel row data is sometimes also called "pixel row tone values."

A "pixel area" is an area on the paper corresponding to a pixel in image data. For example, where the resolution of printed image data is 360×360 dpi, a "pixel area" would be a square area of 1/360 inch per side.

A "row area" is an area corresponding to a pixel row on paper. For example, where the resolution of printed image data is 360×360 dpi, a row area is a narrow elongated area 1/360 inch wide.

A "row area" may refer to an area on paper that corresponds to a pixel row in printed image data, or to an area on paper that corresponds to a pixel row in scanned image data. In the drawing, an area of the former type is shown at lower right. The former type of "row area" also represents a target location for formation of a raster line. The latter type of "row area" also represents a measurement location (measurement range) on paper from which a pixel row in the scanned image data was scanned, in other words, a location on paper where an image representing a pixel row (image fragment) is present. As illustrated, a row area at an n-th location is denoted as the "n-th pixel row area." The n-th pixel row area is the target location for formation of the n-th raster line.

An "image fragment" means one portion of an image. In terms of image data, an image showing a given pixel row is an "image fragment" of the image represented by the image data. Or, in a printed image, an image represented by a given raster line is an "image fragment" of the printed image. Also, in a printed image, an image represented by color in a given pixel row is classed as an "image fragment."

Positional relationships between pixel areas and dots are depicted at lower right in FIG. 1. As a result of the second raster line being out of alignment from the second row area due to the effects of head manufacturing errors, the second row area has lighter density. In the fourth row area, as a result of smaller dot size due to the effects of head manufacturing errors, the fourth row area has lighter density. As it will be necessary to describe such density unevenness and density unevenness correction methods, in the present embodiment, the meanings and relationships of terminology such as "raster line", "pixel row", "row area", and so on will be described in accordance with the above.

However, the meanings of common terms such as "image data", "pixel", and so on may be interpreted appropriately in accordance with ordinary technical knowledge, rather than the descriptions above.

Configuration of Line Printer of the Embodiment
Overall Configuration

Figure 2:
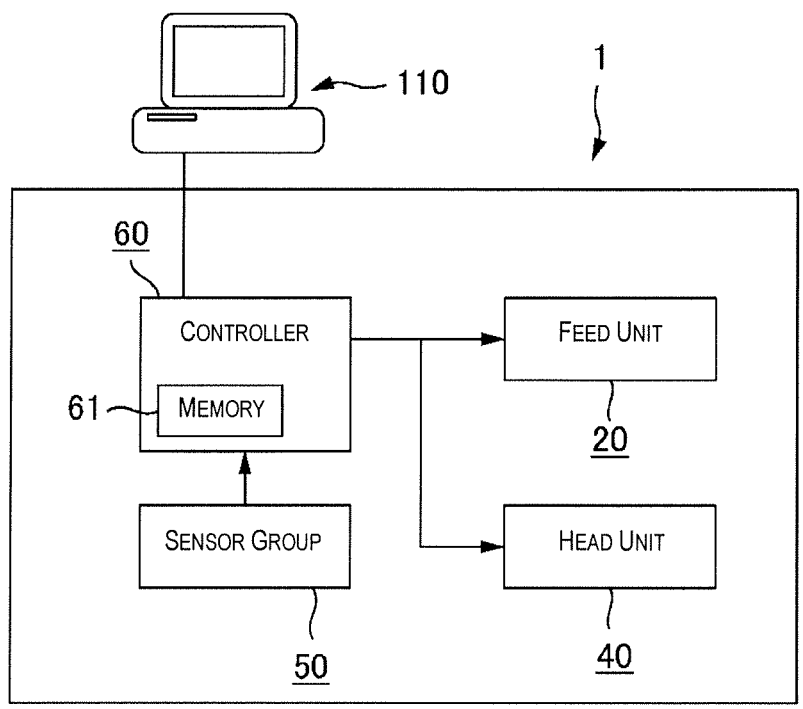
FIG. 2 is a block diagram of the overall configuration of a line printer 1 according to an embodiment.
Figure 3:
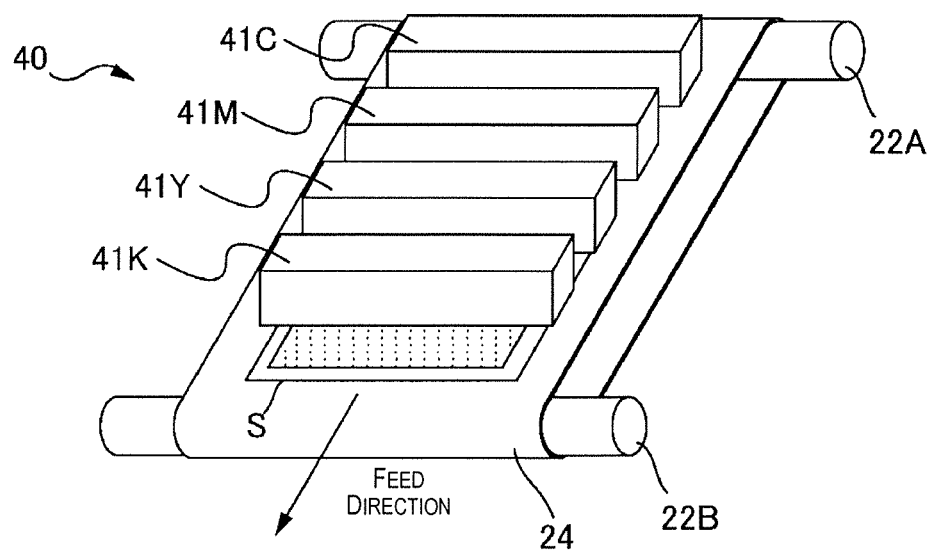
FIG. 3 is a diagrammatic illustration of the overall configuration of the printer 1 of the embodiment.

FIG. 2 is a block diagram of the overall configuration of the line printer 1 of the embodiment. FIG. 3 is a diagrammatic illustration of the overall configuration of the printer 1 of the embodiment. The basic configuration of the printer of the embodiment is described below.

The line printer 1 of the present embodiment has a feed unit 20, a head unit 40, a sensor group 50, and a controller 60. In the printer 1, which receives print data from an external device, specifically, a computer 110, the units (i.e., the feed unit 20 and the head unit 40) are controlled by the controller 60. The controller 60 controls the units on the basis of the received print data and effects printing onto paper (a medium). Conditions in the printer 1 are monitored by the sensor group 50, and the sensor group 50 outputs the detection results to the controller 60. The controller 60 controls the units based on the detection results output by the sensor group 50.

The feed unit 20 is adapted to feed a medium (for example, paper S or the like) in the feed direction. This feed unit 20 has a feed motor (not shown), an upstream roller 22A and a downstream roller 22B, and a belt 24. When the feed motor (not shown) rotates, the upstream roller 22A and the downstream roller 22B rotate, and the belt 24 revolves. The fed paper S is advanced by the belt 24 while positioned facing the head. The paper S which has passed through the printing zone is ejected to the outside by the belt 24. During the feed process, the paper S is held onto the belt 24 by electrostatic attraction or vacuum suction.

The head unit 40 is adapted to eject inks onto the paper S. The head unit 40 has a cyan head group 41C for ejecting cyan ink, a magenta head group 41M for ejecting magenta ink, a yellow head group 41Y for ejecting yellow ink, and a black head group 41K for ejecting black ink. Each head group is able to produce dots equivalent to the width of the paper all at one time.

Figure 4:
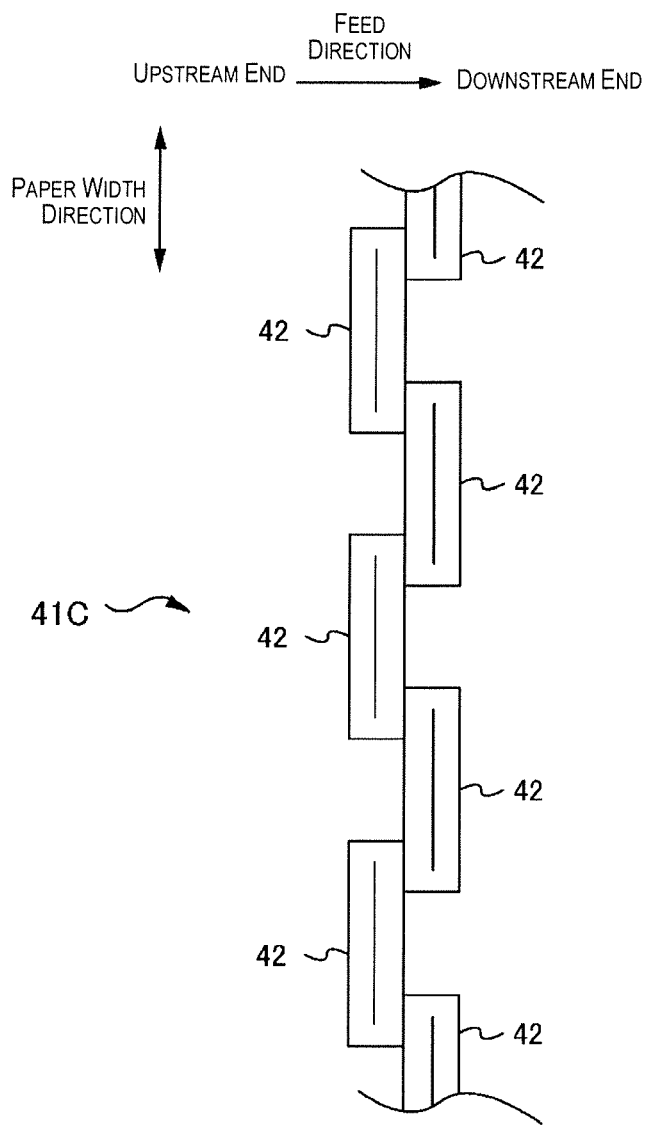
FIG. 4 is an illustration of an array of multiple heads on the bottom face of a cyan head group 41C.

FIG. 4 is an illustration of an array of multiple heads on the bottom face of the cyan head group 41C. As shown in the drawing, the cyan head group 41C has a plurality of heads 42. The plurality of heads are lined up in a staggered row arrangement along the paper width direction. A nozzle row is formed in each head. The nozzle rows are composed of a plurality of nozzles (360 nozzles, for example) that eject cyan ink. The plurality of nozzles that make up a nozzle row are lined up at a given nozzle pitch in relation to the paper width direction.

Figure 5:
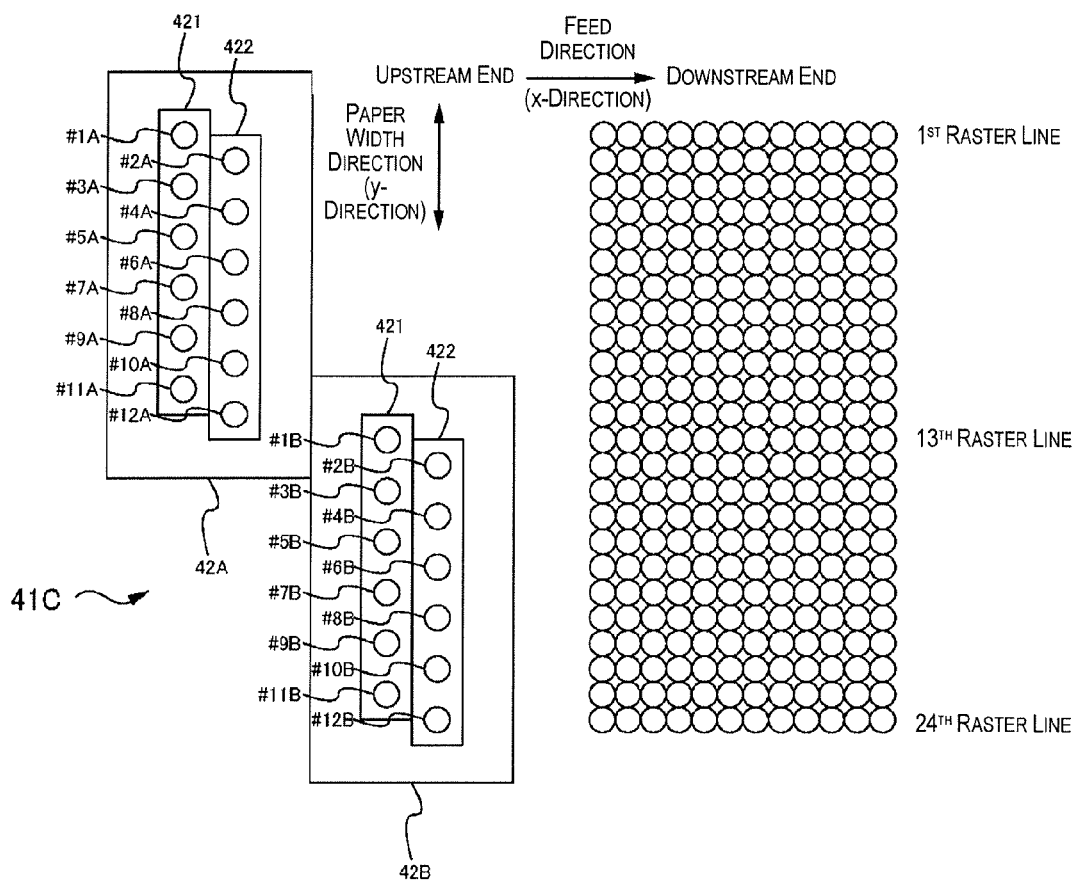
FIG. 5 is an illustration of nozzle placement of the cyan head group 41C and of dot formation thereby.

FIG. 5 is an illustration of nozzle placement of the cyan head group 41C and of dot formation thereby. For the purpose of simplifying the description, the cyan head group 41C is depicted as being composed of two heads (a first head 42A and a second head 42B). To further simplify the description, the nozzle row of each head is depicted as being composed of 12 nozzles. In the following discussion, the feed direction shall be termed the "x direction" and the paper width direction shall be termed the "y direction."

The nozzle row of each head includes a first nozzle group 421 and a second nozzle group 422. Each nozzle group is composed of six nozzles lined up at $1/180$-inch spacing in the paper width direction (y direction). The first nozzle group 421 and the second nozzle group 422 are offset by $1/360$ inch in the paper width direction. Therefore, the nozzle row of each head is composed of 12 nozzles lined up in a staggered row arrangement at $1/360$-inch spacing in relation to the paper width direction. Numbers are sequentially assigned to the nozzle rows of the heads, starting from the top in the drawing.

As the paper S advances, ink droplets are ejected intermittently from the nozzles, thereby producing 24 raster lines on the paper. For example, nozzle #1A of the first head 42A produces a first raster line on the paper, and nozzle #1B of the second head 42B produces a thirteenth raster line on the paper. The raster lines are formed along the feed direction (x direction). By ejecting ink from the nozzles each time that the paper advances by $1/360$ inch, a dot pattern of 360 dpi×360 dpi is formed on the paper.

While the description here relates to the configuration of the cyan head group 41C, the configurations of the head groups for the other colors are comparable.

The sensor group 50 has a rotary encoder and a paper detection sensor (not shown). The rotary encoder (not shown) detects the amount of rotation of the upstream roller 22A and the downstream roller 22B. The amount of advance of the paper S can be detected based on the detection results of this rotary encoder. The paper detection sensor (not shown) is adapted to detect the location of the leading edge of the paper as the paper is being fed. Also, the location of the paper S in the feed direction can be detected through detection of the amount of advance of the paper S by the rotary encoder once the paper is initially detected by the paper detection sensor.

The controller 60 is a control unit (control section) for carrying out control of the printer. The controller 60 controls the units according to a program which is stored in a memory 61. Various correction values are also stored in the memory 61.

First Reference Example

Normal Process of Printer Driver

A printer driver is installed on the computer 110 (FIG. 2). The computer 110 on which the printer driver has been installed functions as a print control device for controlling the printer 1. The printer driver receives image data (input image data) from an application program, converts this to print data of a format that can be rendered by the printer 1, and outputs the print data to the printer. During conversion of input image data to print data, the printer driver carries out processes such as a color conversion process and a halftoning process.

Figure 6A:
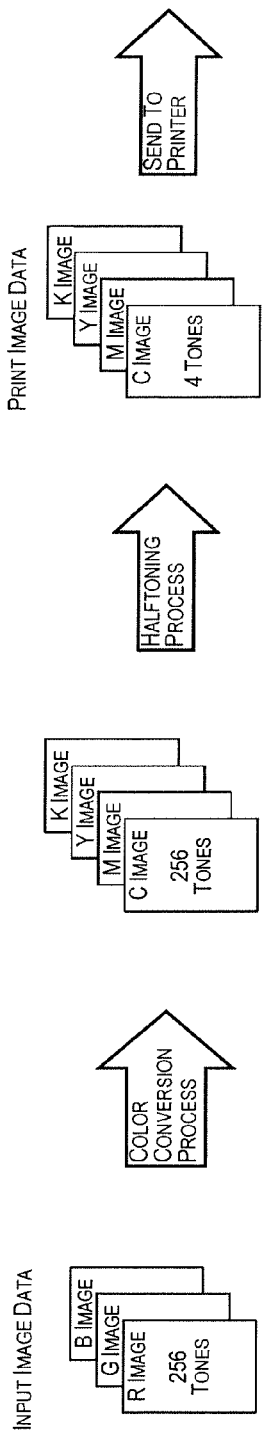
FIG. 6A is an illustration of a process of a printer driver in a first reference example.

FIG. 6A is an illustration of a process of a printer driver in a first reference example. The first reference example is a process that does not involve correcting density unevenness.

Prior to the color conversion process, the image data is 256-tone RGB color space image data. If necessary, prior to the color conversion process, the printer driver carries out a resolution conversion process to match the resolution of the input image data to the print resolution. For example, if image data in vector format has been received from an application program, the printer driver converts the vector format image data to 256-tone RGB color space image data of bitmap format.

Next, the printer driver carries out the color conversion process to convert the RGB color space image data to image data of the CMYK color space, which is the same color space as the ink colors. The printer driver carries out this color conversion process through lookup in a table that maps tone values of pixel data in the RGB color space to tone values of pixel data in the CMYK color space (color conversion lookup table LUT). Subsequent to the color conversion process, the image data is 256-tone CMYK color space image data.

Subsequent to the color conversion process, the printer driver carries out a halftoning process to convert the 256-tone image data to image data of four tones, which is the number of tones that the printer is capable of producing. The halftoning process may utilize a dithering process, gamma correction, error diffusion process, or the like. Subsequent to the halftoning process, the image data takes the form of print image data that represents formation states (dot on/off, dot size) of the dots that make up the printed image.

Subsequent to the halftoning conversion process, the printer driver sends the print image data to the printer 1. In the process of sending the print image data to the printer 1, the printer driver may optionally carry out a rasterization process to reorder the sequence of the pixel data of the print image data, a command appending process to append data command data needed for control of the printer to the printing image, or the like.

The printer that has received the print image data ejects inks from the nozzles according to the tone values indicated by the pixel data values of the print image data, and forms dots in the pixel areas on the medium. The printer 1 is thereby able to print the image represented by the print image data onto a medium.

Second Reference Example

Single-Color Unevenness Correction Process

Where printing is carried out according to the normal process of the first reference example, in some instances streak-like density unevenness may occur in the printed image. This density unevenness is thought to be caused by failure of the multitude of dot rows that make up the printed image to be formed in ideal fashion due to the effects of manufacturing errors of the heads, so that individual dot rows are darker or lighter depending on dot size, or the dot rows are formed out of alignment.

Because the printed image is composed of superimposed images of the same color space as the ink colors, it is thought that if density unevenness of the individual colors (single-color unevenness) of the same color space as the ink colors is respectively suppressed, density unevenness in the printed image as a whole may be suppressed as well. According to this second reference example, density unevenness is respectively detected on an individual ink color basis, and single-color unevenness correction values for the ink colors are acquired from the detection results. When a user who has purchased the printer 1 wishes to carry out printing, the printer driver carries out a single-color unevenness correction process with single-color unevenness correction values on the image data values of the CMYK color space, to obtain a printed image in which density unevenness is suppressed.

Method of Acquiring Single-Color Unevenness Correction Values

The discussion turns first to the method for acquiring the single-color unevenness correction values. The process of acquiring single-color unevenness correction values is carried out during the inspection process at the factory where the printer 1 is manufactured (however, acquisition of single-color unevenness correction values may also be carried out by the user who has purchased the printer 1). The description here focuses on the method for acquiring the single-color unevenness correction values for cyan. The method for acquiring the single-color unevenness correction values will be the same for the other ink colors (magenta, yellow, and black) as well.

Figure 7A:
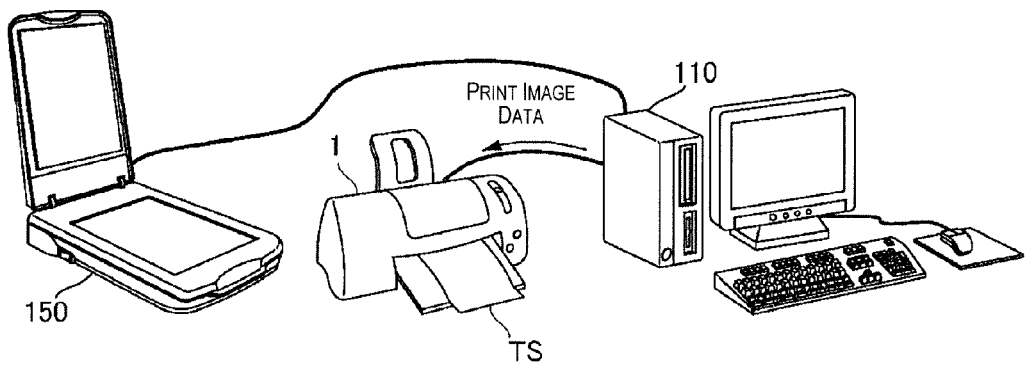
FIGS. 7A to 7C are illustrations depicting conditions up to the point in time that the printer 1 acquires a single-color unevenness correction values (or mixed-color unevenness correction values)
Figure 7B:
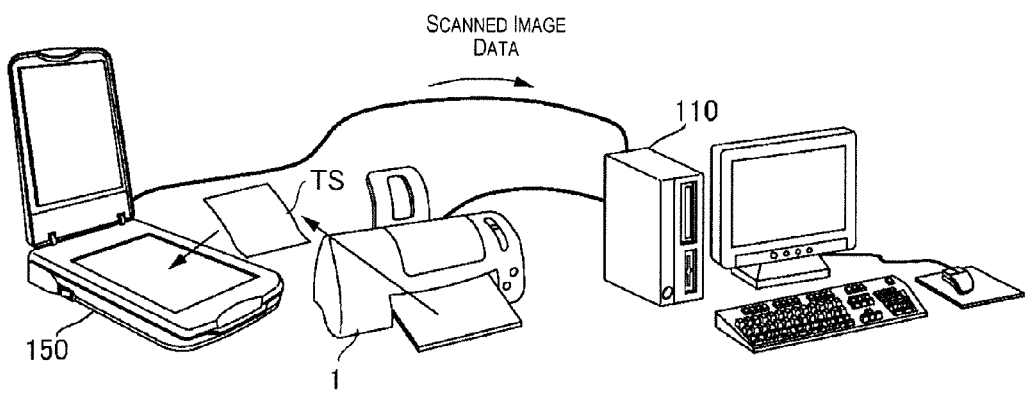
Figure 7C:
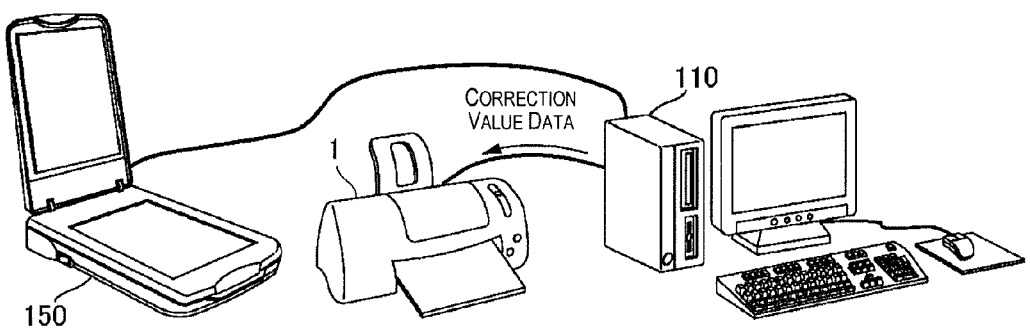
Figure 8:
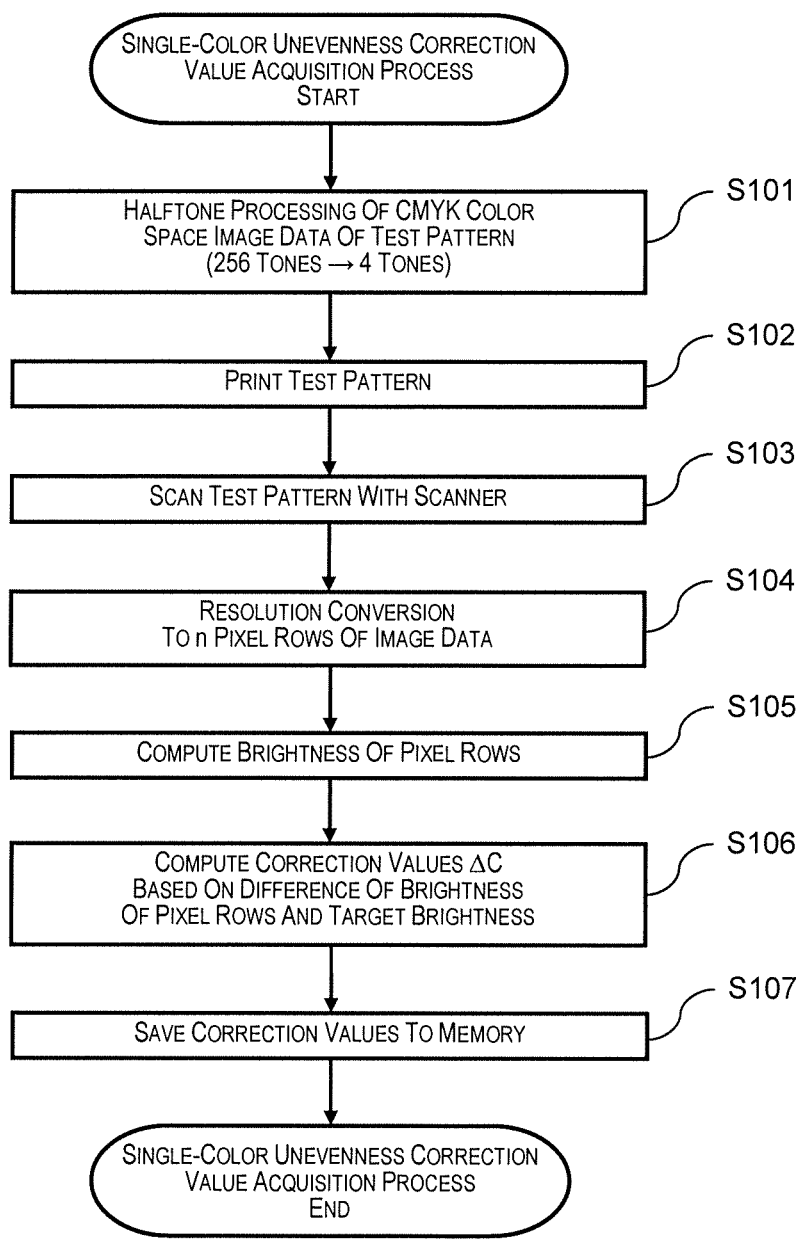
FIG. 8 is a flow chart of a single-color unevenness correction value acquisition process.

FIGS. 7A to 7C are illustrations depicting conditions up to the point in time that the printer 1 acquires a single-color unevenness correction values. FIG. 8 is a flow chart of the single-color unevenness correction value acquisition process.

Initially, the inspector connects the printer 1 being inspected to a computer 110 at the factory (see FIG. 7A). A scanner 150 is also connected to this computer 110. A printer driver, a scanner driver, and a correction value acquisition program adapted to perform image processing of image data acquired from the scanner 150 (scanned image data) and to compute single-color unevenness correction values are installed on the computer 110.

The printer driver (or the correction value acquisition program) is provided with image data of a test pattern for acquisition of single-color unevenness correction values beforehand. This test pattern image data is 256-tone CMYK color space image data of resolution matched to the print resolution (360 dpi×360 dpi). The test pattern image is composed of a plurality of juxtaposed pixel rows (here, 24 pixel rows).

Figure 9:
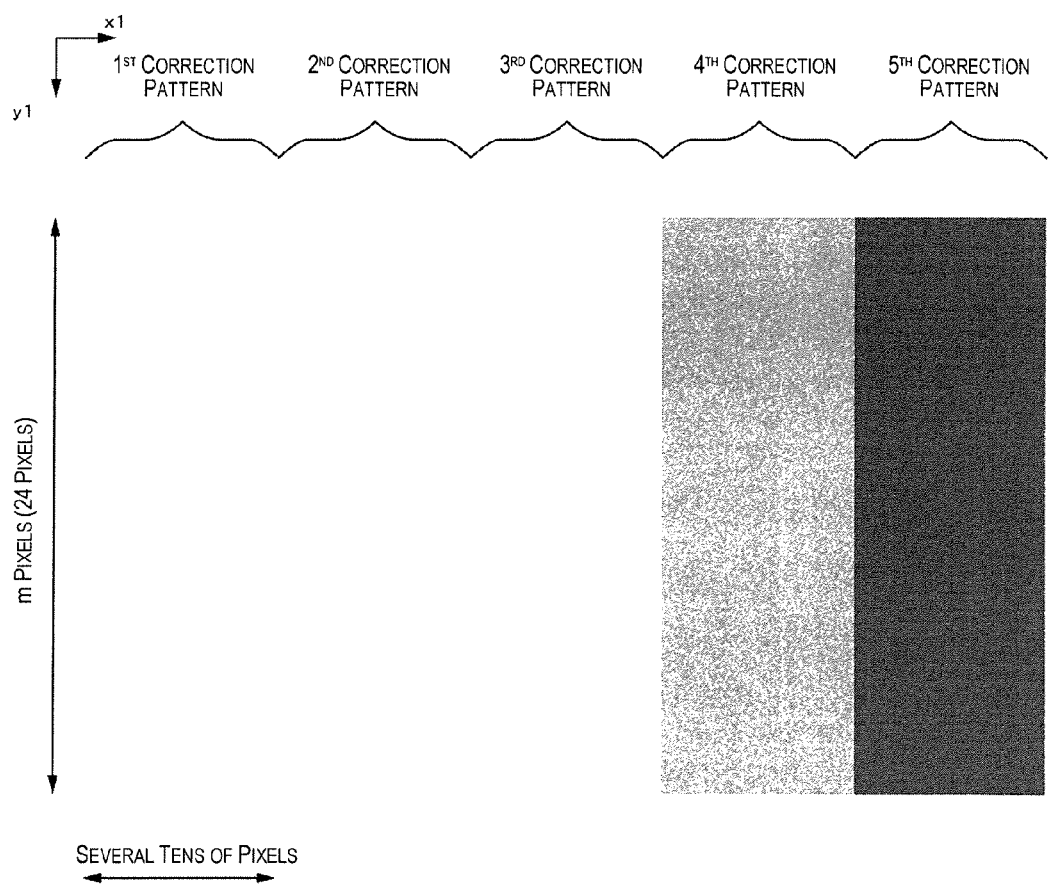
FIG. 9 is an illustration of C image data of a test pattern for acquisition of single-color unevenness correction values for cyan.

FIG. 9 is an illustration of C image data of a test pattern for acquisition of single-color unevenness correction values for cyan. The test pattern is composed of five correction patterns. The five correction patterns are juxtaposed along the x1 direction. The x1 direction on the image data is the direction that is the feed direction (x direction) when the printer 1 prints the image represented by the image data.

The five correction patterns have respectively different tone values of cyan. The tone value Ca of the pixels that make up the first correction pattern is 179; the tone value Cb of the pixels that make up the second correction pattern is 153; the tone value Cc of the pixels that make up the third correction pattern is 128; the tone value Cd of the pixels that make up the fourth correction pattern is 102; and the tone value Ce of the pixels that make up the first correction pattern is 76.

Each of the correction patterns are composed of a several tens of pixels (x1 direction)×24 pixels (y1 direction). The pixel count in the y1 direction is equivalent to the number of raster lines produced in the paper width direction by the printer 1. Here, the pixel count in the y1 direction is 24, which is equal to the number of nozzles of the head group 41 (see FIG. 5).

The printer driver carries out a halftoning process on the image data shown in FIG. 9 (S101 of FIG. 8). The 256-tone C image data is thereby converted to 4-tone C image data (cyan print image data). 24 sets of pixel row data in the 4-tone C image data indicate dot formation states of 24 raster lines.

Next, the printer driver sends the 4-tone C image data (print image data) to the printer 1, which prints out an image of the cyan test pattern onto a test sheet TS (FIG. 7A, S102 of FIG. 8). Here, the test pattern is printed at 360 dpi×360 dpi resolution. A test pattern of five correction patterns, each of which being composed of 24 raster lines, is printed out thereby.

The cyan test pattern which has been printed onto the test sheet TS is substantially identical to the image represented by the C image data of FIG. 9. However, due to the effects of manufacturing errors of the heads, not all dots are formed with ideal size and location, and individual dot rows may be darker or lighter, or dot rows may be formed out of alignment. For this reason, notwithstanding the fact that the tone values indicated by the pixel data of the correction patterns of the C image data are uniform, the correction patterns on the printed image may contain density unevenness.

Next, the inspector places the test sheet TS on the scanner 150, and using the scanner driver of the computer 110, prompts the scanner 150 to scan the test pattern (FIG. 7B, S103 of FIG. 8). Here, the scanner 150 scans the test pattern at a scan resolution of 1440 dpi×1440 dpi. That is, the scanner 150 scans the test pattern at a scan resolution which is higher than the 360 dpi×360 print resolution.

Optionally, the correction value acquisition program of the computer 110 performs a rotation process, trimming process, etc., of the scanned image data, on the image data acquired from the scanner 150 (scanned image data), if necessary.

Figure 10:
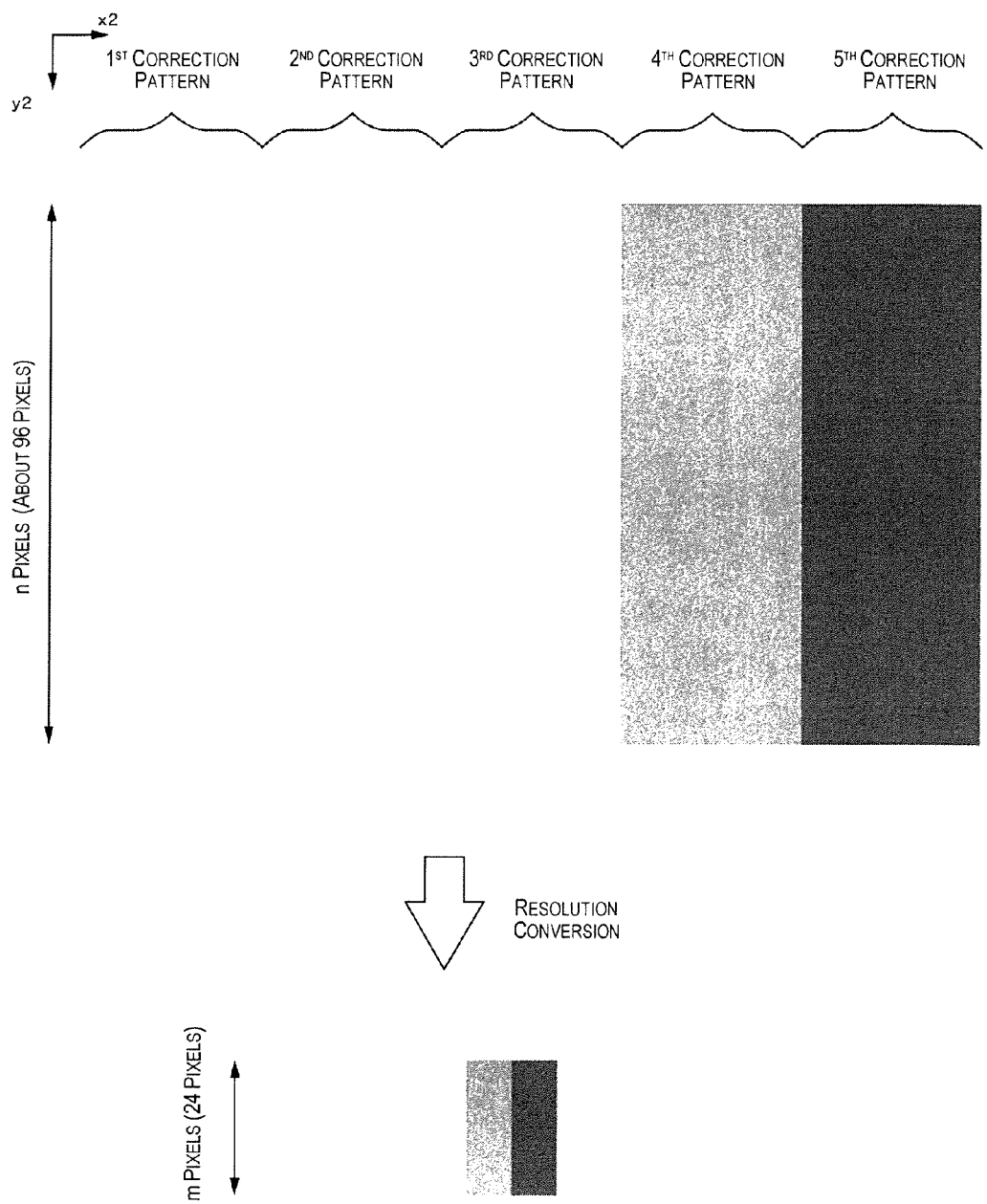
FIG. 10 is an illustration of scanned image data.

FIG. 10 is an illustration of the scanned image data. The test pattern in the scanned image data is likewise composed of five correction patterns. In the scanned image data, the direction in which the five correction patterns are juxtaposed is denoted as the x2 direction, and the direction orthogonal to the x2 direction is denoted as the y2 direction. The x2 direction in the scanned image data is parallel to the raster line images. In other words, the correction value acquisition program of the computer 110 performs a rotation process on the scanned data if necessary, so that the x2 direction of the scanned image data is parallel to the raster line images.

Here, the test pattern which is composed of 24 raster lines juxtaposed at 360 dpi is scanned at 1440 dpi (a resolution four times higher than the print resolution). For this reason, the pixel count of the scanned image data in the y2 direction should theoretically be equal to 96 (=24×4), but due to the effects of head manufacturing errors, scan errors by the scanner 150, and the like, the pixel count of the scanned image data in the y2 direction may not always equal exactly 96.

Next, the correction value acquisition program of the computer 110 performs resolution conversion on the image data acquired from the scanner 150 (scanned image data), to bring the pixel count in the y2 direction to 24 (S104 of FIG. 8). The pixel count in the y2 direction subsequent to resolution conversion is equivalent to the number of raster lines formed in the paper width direction by the printer 1. Here, the pixel count in the y2 direction is 24, which is equal to the number of nozzles of the head group 41 (see FIG. 5).

The pixel row data sequences (lines of pixels juxtaposed in the x2 direction) in the scanned image data subsequent to resolution conversion represent image fragments of row areas ⅟₃₆₀ inch in width on the paper onto which the test pattern was printed. In other words, the pixel rows in the scanned image data subsequent to resolution conversion represent image fragments of row areas having width corresponding to the print resolution (width of ⅟₃₆₀ inch).

Next, for each correction pattern in the scanned image data, the correction value acquisition program of the computer 110 computes the brightness of the pixel rows (S105 of FIG. 8). The brightness of the pixel rows is considered to indicate the densities of the row areas on the printed test pattern.

Figure 11:
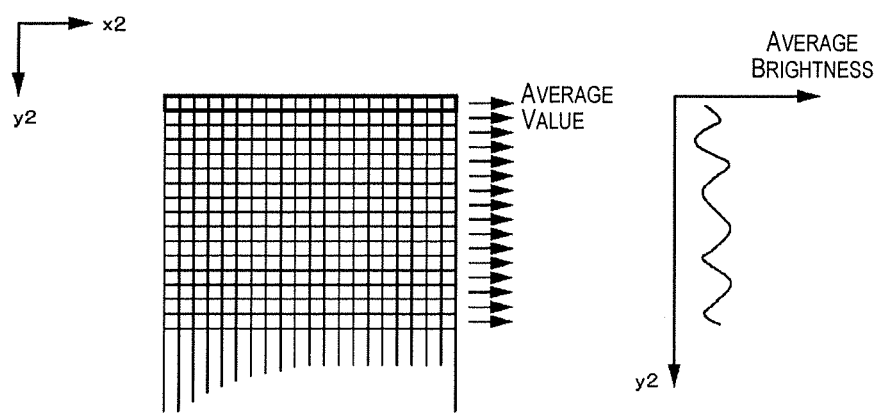
FIG. 11 is an illustration depicting computation of brightness of individual pixel rows.

FIG. 11 is an illustration depicting computation of brightness of individual pixel rows. The left side of the drawing shows pixels making up a given correction pattern on scanned image data. The correction value acquisition program computes average brightness for each individual pixel row, on the basis of the pixel data of a plurality of pixels lined up in the x2 direction, and designates this average brightness as the brightness of the pixel row in question. For example, the brightness of the first pixel row is computed on the basis of the pixel data inside the heavy lines at left in the drawing. The right side of the drawing shows a graph of brightness of the pixel rows. Due to the presence of density unevenness in the printed image, there are variations in brightness of the pixel rows in the scanned image data.

In the following discussion, the brightness of the j-th pixel row of scanned image data of the first correction pattern having the tone value Ca (~179) is denoted as "Ya_j." Likewise, the brightness of the j-th pixel row of scanned image data of the second correction pattern having the tone value Cb (~153) is denoted as "Yb_j"; the brightness of the j-th pixel row of scanned image data of the third correction pattern having the tone value Cc (=128) is denoted as "Yc_j"; the brightness of the j-th pixel row of scanned image data of the fourth correction pattern having the tone value Cd (=102) is denoted as "Yd_j"; and the brightness of the j-th pixel row of scanned image data of the fifth correction pattern having the tone value Ce (=76) is denoted as Ye_j.

Next, based on the difference between the brightness of the pixel rows and a target brightness, the correction value acquisition program of the computer 110 computes a single-color correction value ΔC for each pixel row (S106 of FIG. 8). Here, the single-color correction value for the j-th pixel row is discussed.

Figure 12A:
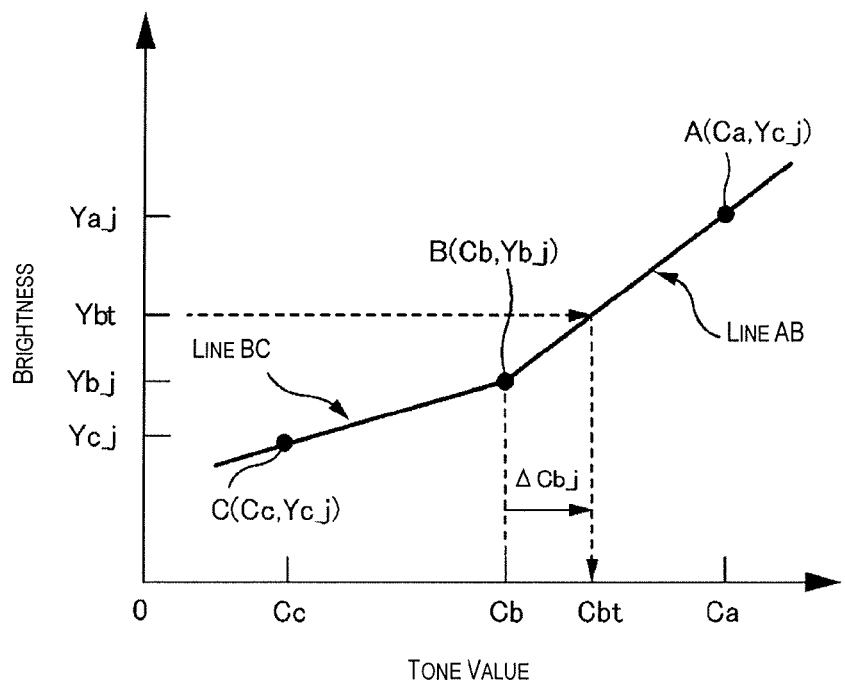
FIGS. 12 (A and B) are illustrations of a single-color unevenness correction value Cb_j of a j-th pixel row for a tone value Cb.
Figure 12B:
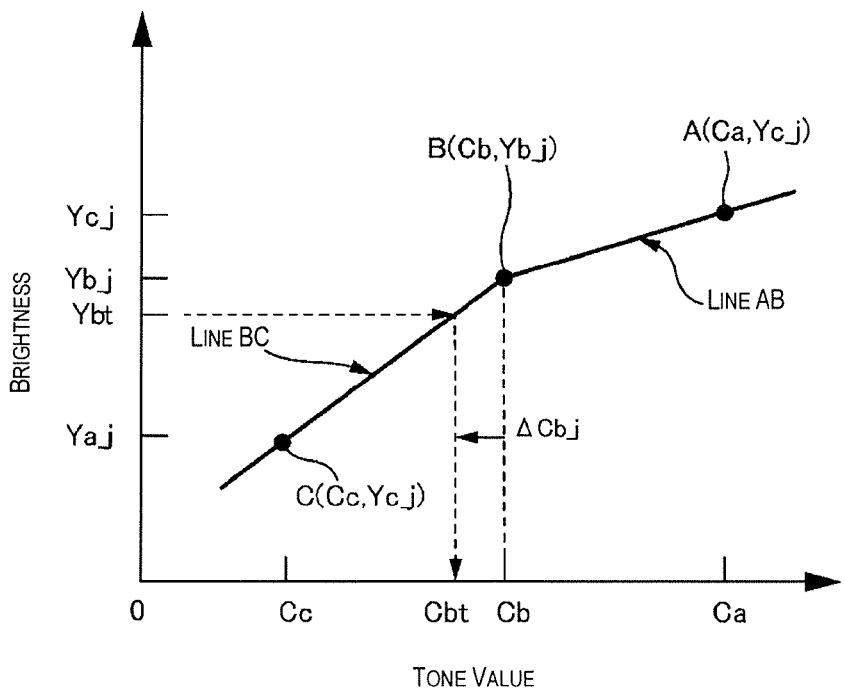

FIGS. 12A and 12B are illustrations of a single-color unevenness correction value Cb_j of the j-th pixel row for the tone value Cb. In the drawings, the horizontal axis indicates the tone value of the pixel data, and the vertical axis indicates the brightness value. A target brightness Ybt for the tone value Cb is also shown in the drawings. This target brightness Ybt represents the average value of brightness of all pixel rows in the scanned image data of the second correction pattern. Specifically, the target brightness Ybt is a value derived by dividing the sum of Yb__1 to Yb__24 by 24.

As shown in FIG. 12A, if the brightness Yb_j of the j-th pixel row is less than the target brightness Ybt, the correction value acquisition program, utilizing linear interpolation based on a straight line AB, computes a tone value Cbt that corresponds to the target brightness Ybt. The difference between the tone value Cbt and the tone value Cb is then computed as a single-color unevenness correction value ΔCb_j.

As shown in FIG. 12B, if the brightness Yb_j of the j-th pixel row is greater than the target brightness Ybt, the correction value acquisition program, utilizing linear interpolation based on a straight line BC, computes a tone value Cbt that corresponds to the target brightness Ybt. The difference between the tone value Cbt and the tone value Cb is then computed as a single-color unevenness correction value ΔCb_j.

In this way, the correction value acquisition program computes a single-color unevenness correction value for each of the respective pixel rows, doing so for each of the five different tone values (Ca to Ce). When computing a single-color unevenness correction value ΔCa_j for the lightest tone value Ca (~179), the correction value acquisition program carries out linear interpolation based on a straight line between the two points (255, 225), (Ca, Ya_j). When computing a single-color unevenness correction value ΔCe_j for the darkest tone value Ce (~76), the correction value acquisition program carries out linear interpolation based on a straight line between the two points (0, 0), (Ce, Ye_j).

FIG. 13 is an illustration of a single-color unevenness correction value table. The computed single-color unevenness correction values ΔC are stored in the single-color unevenness correction value table, in association with the tone values and pixel rows. The correction value acquisition program of the computer 110 sends the single-color unevenness correction value table to the printer 1, where the single-color unevenness correction value table is stored in the memory 61 of the printer 1 (FIG. 7C, S107 of FIG. 8).

While the preceding discussion described only the procedure for cyan, single-color unevenness correction values are computed analogously for the other colors (magenta, yellow, and black) as well, and the single-color unevenness correction value tables are stored in the memory 61 of the printer 1. Once the single-color unevenness correction value tables have been stored in the memory 61 of the printer 1 in this way, the printer 1 is packaged and shipped from the factory.

Single-Color Unevenness Correction Process

The user who has purchased the printer 1 installs onto his or her own computer the printer driver which is included on CD-ROM in the same package with the printer 1 (or a printer driver that has been downloaded from the website of the printer manufacturer). The user also connects the computer to the printer 1. At this point, the printer driver acquires from the printer 1 the correction value table (see FIG. 13) that is stored in the memory 61 of the printer 1.

Figure 6B:
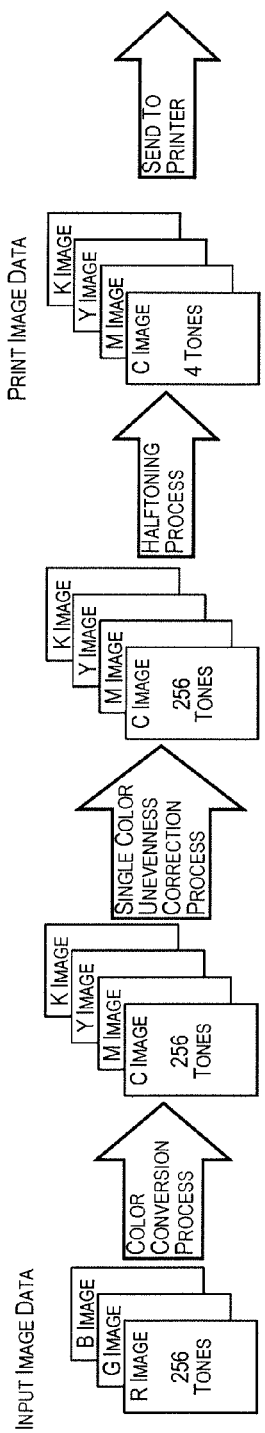
FIG. 6B is an illustration of a single-color unevenness correction process in a second reference example.

FIG. 6B is an illustration of the single-color unevenness correction process in the second reference example. In the second reference example, density unevenness of each color of the same color space as the ink colors is corrected. The printer driver carries out single-color unevenness correction processes on the 256-tone CMYK color space image data subsequent to the color conversion process, but prior to the halftoning process. Here, the single-color unevenness correction process for cyan 256-tone image data is discussed.

FIG. 14 is an illustration of a single-color unevenness correction process for the tone values of the pixel data. The horizontal axis in the drawing indicates tone values prior to correction, and the vertical axis in the drawing indicates tone values subsequent to correction.

Assuming for illustrative purposes that prior to correction all of the pixel data of the image data has tone values Cb (=153), the printer driver, using the correction value ΔCb_j for the tone value Cb, appropriately corrects the pixel data tone values Cb to Cb+ΔCb_j. Likewise, if prior to correction all of the pixel data of the image data has tone values Cc (=128), the printer driver, using the correction value ΔCc_j for the tone value Cc, appropriately corrects the pixel data tone values Cc to Cc+ΔCc_j.

On the other hand, if tone values C_in of pixel data prior to correction are different from any of the tone values (Ca to Ce) of the correction patterns, for example, if a tone value C_in prior to correction lies between Cb and Cc, the printer driver carries out linear interpolation using the correction value ΔCb_j and the correction value ΔCc_j, and computes a tone value C_out.

According to the graph in the drawing, the correction value ΔCa_j is a positive value. Therefore, if a tone value C_in prior to correction is a value close to the tone value Ca, the printer driver corrects the tone value of the pixel data such that the corrected tone value is higher. Also, according to the graph in the drawing, the correction value ΔCe_j is a negative value. Therefore, if a tone value C_in prior to correction is a value close to the tone value Ce, the printer driver corrects the tone value of the pixel data such that the corrected tone value is lower. By so doing, the printer driver is able to correct image data in such a way that pixels in sections that print out at darker shades are corrected to a lighter shade, and pixels in sections that print out at lighter shades are corrected to a darker shade.

Here, correction of tone values of pixel data belonging to the j-th pixel row was discussed, but tone values are corrected analogously for pixel data belonging to the other pixel rows as well. However, for pixel data belonging to the other pixel rows, the correction values that correspond to the pixel rows in question would be used.

The printed image data having undergone the single-color unevenness correction process is 256-tone CMYK color space image data. Subsequent to the single-color unevenness correction process, the printer driver carries out the halftoning process and sends the print image data to the printer 1 (see FIG. 6B). Here, the halftoning process and the print image data transmission process are comparable to those in the first reference example.

According to the second reference example, however, the halftoning process is carried out on image data that has been subjected to the density unevenness correction process. As a result, tone values of pixel data belonging to a pixel row that, for example, corresponds to a row area likely to be perceived as having a lighter shade, are corrected in advance to lower (darker) values, and therefore the dot formation rate in the pixel row in question on the image data subsequent to halftoning will be higher. Additionally, because tone values of pixel data belonging to a pixel row that, for example, corresponds to a row area likely to be perceived as having a darker shade, are corrected in advance to higher (lighter) values, the dot formation rate in the pixel row in question on the image data subsequent to halftoning will be lower. Consequently, in row areas likely to be perceived as having a lighter shade there are formed raster lines that have been corrected in such a way as to increase the dot formation rate, whereas in row areas likely to be perceived as having a darker shade there are formed raster lines that have been corrected in such a way as to decrease the dot formation rate, thereby affording respective correction of density of image fragments of row areas in the printed image, and suppressing density unevenness in the printed image.

While the preceding discussion described only the single-color unevenness correction process for cyan image data, the single-color unevenness correction process is carried out analogously for the other colors (magenta, yellow, and black) as well.

Problem Areas of the Second Reference Examples

According to single-color unevenness correction as described above, single-color unevenness correction values are acquired by forming test patterns for each ink color, and performing respective correction of density unevenness in the images of each color. This single-color unevenness correction process assumes that if density unevenness of individual ink colors (single-color unevenness) can be suppressed, density unevenness in the printed image composed of these superimposed colors can be suppressed as well. However, there are instances in which, notwithstanding successful respective correction of density unevenness of images of the colors of the same color space as the ink colors, unevenness (mixed-color unevenness) arises in the printed image composed of these multiple superimposed colors.

Figure 15:
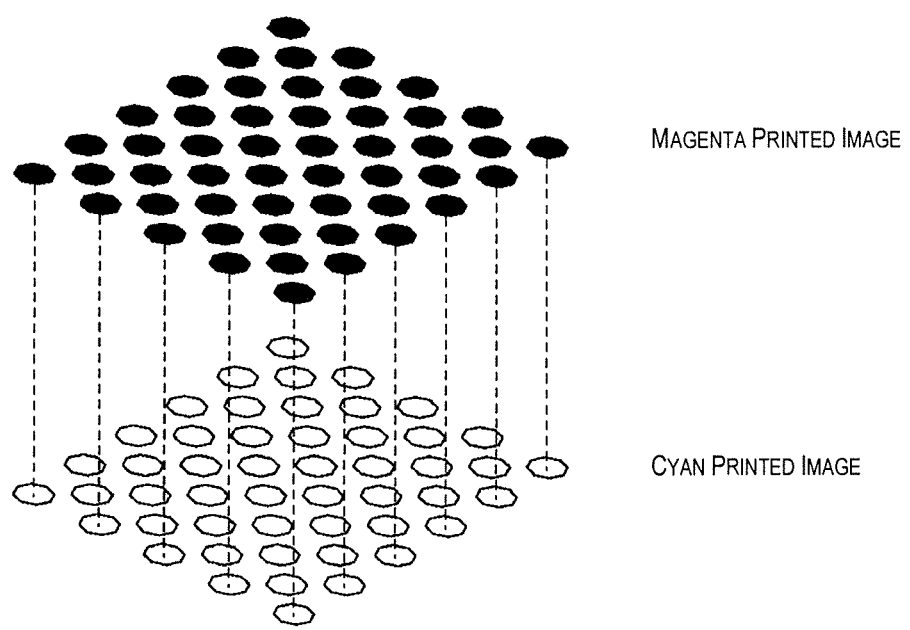
FIG. 15 is an illustration of the cause of mixed-color unevenness.

FIG. 15 is an illustration of the cause of mixed-color unevenness. The white circles to the lower side in the drawing represent cyan dots formed on the paper. The black circles to the upper side in the drawing represent magenta dots formed over the cyan dots. Because the magenta head group 41M is situated to the downstream side of the cyan head group 41C in the feed direction (see FIG. 3), the magenta printed image is formed over the cyan printed image. As a result, there are instances in which magenta dots are formed over cyan dots.

A magenta dot formed over a cyan dot differs in terms of spread and penetration of the ink, as compared with a magenta dot that is formed on blank paper in the absence of a cyan dot. Consequently, depending on the presence or absence of a cyan dot, the magenta dot will differ in shape and color shade. As a result, even if a single-color unevenness correction process has been carried out respectively on the cyan image and the magenta image, density unevenness (mixed-color unevenness) may arise in the final printed image, due to superposition of the magenta printed image over the cyan printed image.

Thus, according to the present embodiment, a mixed-color unevenness correction process is carried out in order to suppress mixed color unevenness in printed images composed of multiple superimposed colors.

Embodiment

Mixed Color Unevenness Correction Process
Method of Acquiring Mixed-Color Unevenness Correction Values First, the method of acquiring mixed-color unevenness correction values is described. The process of acquiring mixed-color unevenness correction values is carried out during the inspection process at the factory where the printer 1 is manufactured (however, acquisition of mixed-color unevenness correction values may also be carried out by the user who has purchased the printer 1).

Figure 16:
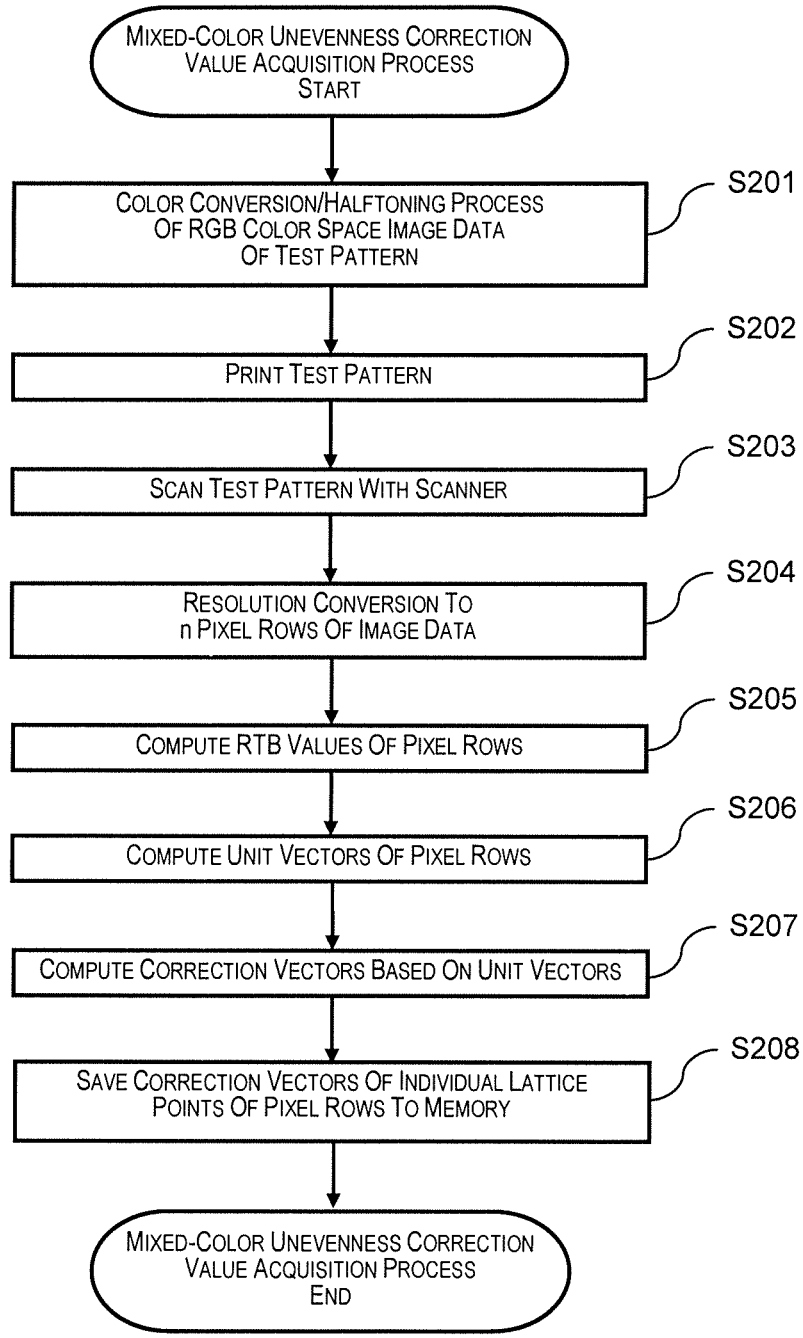
FIG. 16 is a flow chart of a mixed-color unevenness correction value acquisition process.

FIG. 16 is a flow chart of the mixed-color unevenness correction value acquisition process. Circumstances up to the point that the printer 1 acquires mixed-color unevenness correction values are comparable to those in FIGS. 7A to 7C discussed previously.

Initially, the inspector connects the printer 1 being inspected to a computer 110 at the factory (see FIG. 7A). A scanner 150 is also connected to this computer 110. A printer driver, a scanner driver, and a correction value acquisition program adapted to perform image processing of image data acquired from the scanner 150 (scanned image data) and to compute mixed-color unevenness correction values are installed on the computer 110.

The printer driver (or the correction value acquisition program) is provided with image data of a test pattern for acquisition of mixed-color unevenness correction values beforehand. This test pattern image data is 256-tone RGB color space image data of resolution matched to the print resolution (360 dpi×360 dpi). Whereas the image data of the test pattern of FIG. 9 discussed previously is represented in the CMYK color space, the image data of the test pattern for acquiring mixed-color unevenness correction values is represented in the RGB color space. The test pattern image is composed of a plurality of pixel rows (here, 24 pixel rows) extending along the x1 direction and juxtaposed in the y1 direction.

Figure 17:
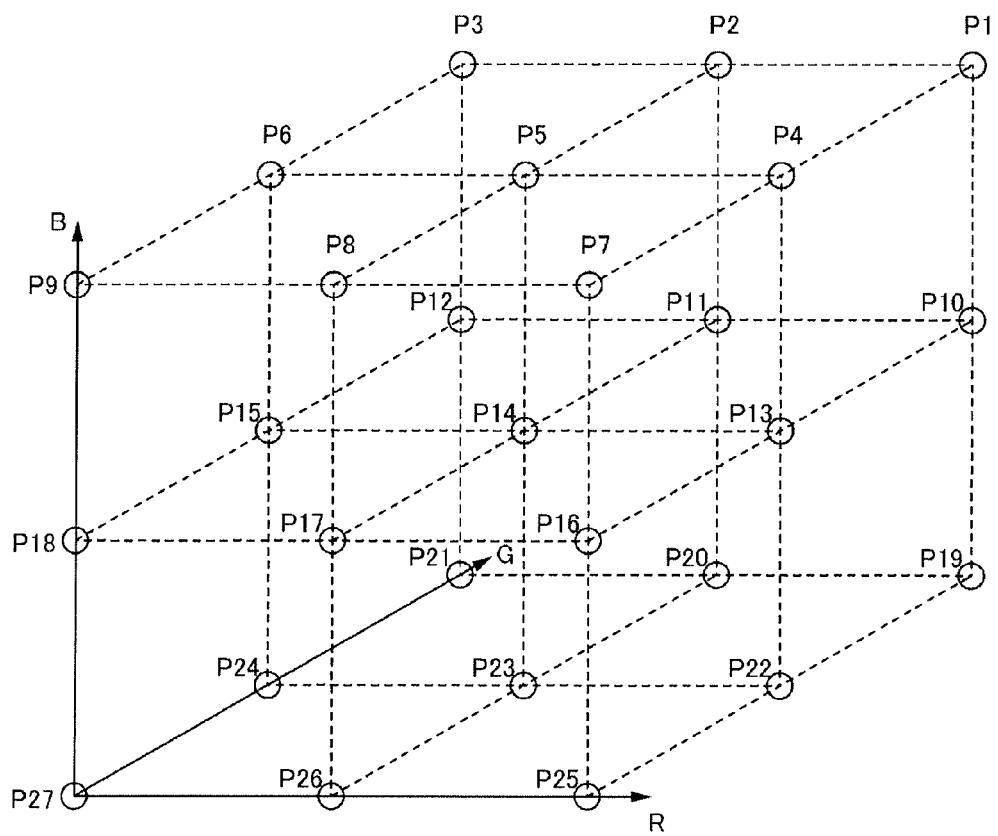
FIG. 17 is a drawing depicting tone values of correction patterns of a test pattern, represented as coordinates in the RGB color space.

FIG. 17 is a drawing depicting tone values of the correction patterns of the test pattern, represented as coordinates in the RGB color space. FIG. 18A is an illustration of image data of a test pattern for acquisition of a mixed-color unevenness correction values. FIG. 18B is a table showing tone values of 27 correction patterns of a test pattern.

In the following description, coordinates (tone values) represented by circles in FIG. 17 are sometimes referred to as "lattice points." The lattice points are respectively situated at prescribed coordinates in the RGB color space. A lattice point corresponding to an i-th correction pattern is sometimes referred to as a "lattice point Pi." RGB values of a lattice point Pi are sometimes denoted as (ri, gi, bi) and referred to as "input RGB values."

The test pattern is composed of 27 correction patterns. The 27 correction patterns are juxtaposed along the x1 direction. The x1 direction on image data is the direction that is the feed direction (x direction) when the image data is printed by the printer 1.

Whereas the RGB tone values (input RGB values) that make the image data of the correction patterns are uniform, the RGB values of the 27 correction patterns respectively differ. In the present embodiment, the respective values of RGB vary in three levels to provide correction patterns of 27 colors that respectively correspond to the 27 (=3×3×3) lattice points. However, values may vary in a greater number of levels than three levels. The colors represented by the lattice points are sometimes referred to as "reference colors."

For example, the first correction pattern that corresponds to lattice point P1 is a white pattern in which the RGB values of the pixel data are (255, 255, 255). The third correction pattern that corresponds to lattice point P3 is a cyan pattern in which the RGB values of the pixel data are (0, 255, 255). The ninth correction pattern that corresponds to lattice point P9 is a blue pattern in which the RGB values of the pixel data are (0, 0, 255). The fourteenth correction pattern that corresponds to lattice point P14 is a gray pattern in which the RGB values of the pixel data are (128, 128, 128). The twenty-seventh correction pattern that corresponds to lattice point P27 is a black pattern in which the RGB values of the pixel data are (0, 0, 0). In this way, the test pattern is composed of correction patterns of 27 reference colors.

Each of the correction patterns is composed of several tens of pixels (x1 direction)×24 pixels (y1 direction). The pixel count in the y1 direction is equivalent to the number of raster lines produced in the paper width direction by the printer 1. Here, the pixel count in the y1 direction is 24, which is equal to the number of nozzles of the head group 41 (see FIG. 5).

The printer driver carries out the color conversion and halftoning processes on the image data shown in FIG. 18A and generates print image data (S101 of FIG. 16). The print image data at this point is 4-tone CMYK color space image data. This print image data is composed of 24 sequences of pixel row data, and indicates dot formation states of 24 raster lines.

Next, the printer driver sends the print image data to the printer 1 and prompts the printer to print out the test pattern of FIG. 18A (FIG. 7A, S102 of FIG. 16). At this point, the printer 1 ejects cyan ink from the nozzles of the cyan head group 41C (see FIG. 3) in accordance with the C image data of the print image data, ejects magenta ink from the nozzles of the magenta head group 41M in accordance with the M image data, ejects yellow ink from the nozzles of the yellow head group 41Y in accordance with the Y image data, and ejects black ink from the nozzles of the black head group 41K in accordance with the K image data. A test pattern of 27 correction patterns composed of 24 raster lines is printed out thereby.

The test pattern which has been printed onto the test sheet TS is substantially identical to the image represented by the image data of FIG. 18A. However, notwithstanding the fact that the tone values of the pixel data of the correction patterns are uniform, the correction patterns on the printed image may contain density unevenness and/or color unevenness.

Next, the inspector places the test sheet TS on the scanner 150, and using the scanner driver of the computer 110, prompts the scanner 150 to scan the test pattern (FIG. 7B, S103 of FIG. 16). Here, the scanner 150 scans the test pattern at the scan resolution of 1440 dpi×1440 dpi. That is, the scanner 150 scans the test pattern at a scan resolution which is higher than the 360 dpi×360 print resolution.

Optionally, the correction value acquisition program of the computer 110 performs a rotation process, trimming process, etc., of the scanned image data, on the image data acquired from the scanner 150 (scanned image data), if necessary.

Next, the correction value acquisition program of the computer 110 performs resolution conversion on the image data acquired from the scanner 150 (scanned image data), to bring the pixel count in the y2 direction to 24 (S204 of FIG. 16). This process is analogous to that described previously in S104, and therefore no further discussion thereof is necessary. Subsequent to resolution conversion, the pixel rows in the scanned image data represent image fragments of row areas of width equivalent to the print resolution (width of 1/360 inch)

Next, the correction value acquisition program of the computer 110 computes RGB values of the pixel rows, for each correction pattern (each lattice point) in the scanned image data (S205 of FIG. 16). The RGB values of the pixel rows are considered to represent the colors of the row areas on the printed test pattern. Whereas in S105 discussed previously, brightness was computed, in S205, RGB values are computed instead. The correction value acquisition program computes, for each individual pixel row, an average value of the RGB values on the basis of pixel data of the plurality of pixels lined up in the x2 direction, and designates this average value as the RGB value for the pixel row in question. This RGB value is sometimes referred to as an "output RGB value."

FIG. 18C is an illustration of output RGB values of the j-th pixel row. In this manner, the correction value acquisition program of the computer 110 computes an output RGB value for each of the correction patterns (each lattice point), for the first pixel row through the twenty-fourth pixel row, respectively. Owing to the presence of density unevenness/color unevenness in the printed image, the RGB values of the pixel rows in the scanned image data will differ from the tone values of the lattice points.

In the following discussion, the output RGB value in the scanned image data that corresponds to the i-th correction pattern (lattice point Pi) is represented in terms of a vector quantity (Ri, Gi, Bi). The output RGB value (Ri, Gi, Bi) is considered to be a function of the input RGB value (ri, gi, bi), and in some instances is represented as (Ri, Gi, Bi)=Pi(ri, gi, bi). Where it is intended to specifically denote the value for the j-th pixel row, the suffix j is appended, and the value is represented as (Ri_j, Gi_j, Bi_j) or =Pi_j (ri_j, gi_j, bi_j). For example, the RGB value of the third correction pattern in the j-th pixel row of FIG. 18C is P3_j(0, 255, 255)=(98, 156, 214).

Next, the correction value acquisition program of the computer 110 computes unit vectors for each correction pattern (each lattice point), for the respective pixel rows (S206 of FIG. 16). Unit vectors represent the quantity of change (vector) of an output RGB value when an input RGB value corresponding to a lattice point changes by a unit quantity.

The unit vector $\Delta R$ indicates the magnitude of change of the output RGB value when the tone value of R of an input RGB value changes by +1. Likewise, the unit vector $\Delta G$ indicates the magnitude of change of the output RGB value when the tone value of G of an input RGB value changes by +1. The unit vector $\Delta B$ indicates the magnitude of change of the output RGB value when the tone value of B of an input RGB value changes by +1. In the following discussion, the unit vectors $\Delta R$, $\Delta G$, $\Delta B$ of the i-th correction pattern are represented as $\Delta Ri$, $\Delta Gi$, $\Delta Bi$.

Figure 19:
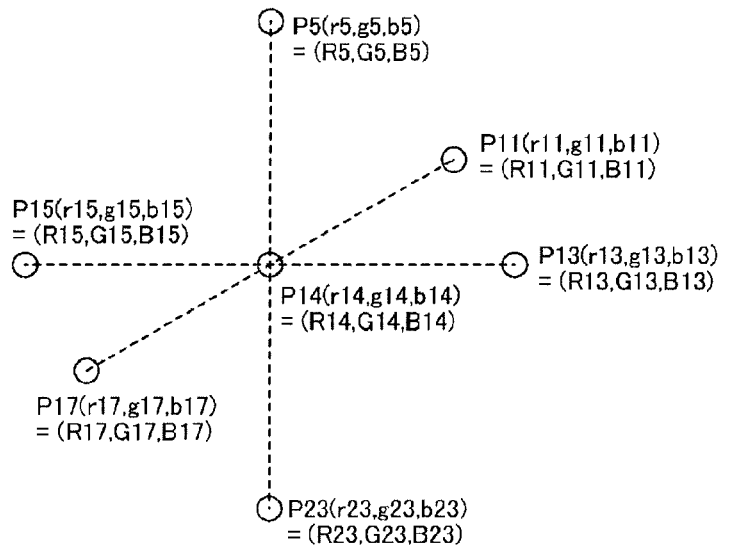
FIG. 19 is an illustration of a unit vector computation method.

FIG. 19 is an illustration of a unit vector computation method.

Unit vectors are calculated in terms of the unit quantity of change in output RGB values between a lattice point targeted for computation of unit vectors, and two adjacent lattice points. $\Delta R$ is computed on the basis of the output RGB values of two adjacent lattice points in the R axis direction (the adjacent lattice point in the plus direction and the adjacent lattice point in the minus direction of the R axis). $\Delta G$ is computed on the basis of the output RGB values of two adjacent lattice points in the G axis direction (the adjacent lattice point in the plus direction and the adjacent lattice point in the minus direction of the G axis). $\Delta B$ is computed on the basis of the output RGB values of two adjacent lattice points in the B axis direction (the adjacent lattice point in the plus direction and the adjacent lattice point in the minus direction of the B axis).

For example, $\Delta R14$, $G14$, and $\Delta B14$ are computed by the following equations.

$$\Delta R14 = \{P13(r13, g13, b13) - P15(r15, g15, b15)\}/(r13 - r15)$$
$$= \{(R13, G13, B13) - (R15, G15, B15)\}/255$$
$$\Delta G14 = \{P11(r11, g11, b11) - P17(r17, g17, b17)\}/(g17 - g11)$$
$$= \{(R11, G11, B11) - (R17, G17, B17)\}/255$$
$$\Delta B14 = \{P5(r5, g5, b5) - P23(r23, g23, b23)\}/(b5 - b23)$$
$$= \{(R5, G5, B5) - (R23, G23, B23)\}/255$$

If there is only one adjacent lattice point (if a lattice point is situated at an edge), the unit vectors are computed as the unit quantities of change in output RGB values between a lattice point targeted for computation of the unit vectors, and a lattice point adjacent to this lattice point. For example, computation is made on the basis of the output RGB value of a lattice point targeted for unit vector computation, and the output RGB value of one lattice point adjacent thereto in the R axis direction.

For example, $\Delta R15$, $\Delta G17$, and $\Delta B23$ are computed by the following equations.

$$\Delta R15 = \{P14(r14, g14, b14) - P15(r15, g15, b15)\}/(r14 - r15)$$
$$= \{(R14, G14, B14) - (R15, G15, B15)\}/128$$
$$\Delta G17 = \{P14(r14, g14, b14) - P17(r17, g17, b17)\}/(g14 - g17)$$
$$= \{(R14, G14, B14) - (R17, G17, B17)\}/128$$
$$\Delta B23 = \{P14(r14, g14, b14) - P23(r23, g23, b23)\}/(b14 - b23)$$
$$= \{(R14, G14, B14) - (R23, G23, B23)\}/128$$

In the above manner, the correction value acquisition program of the computer 110 computes unit vectors of the pixel rows, on an individual correction pattern (individual lattice point) basis. In other words, the correction value acquisition program of the computer 110 computes unit vectors on an individual correction patters (individual lattice point) basis, for each of the first through twenty-fourth pixel rows.

Next, on the basis of the unit vectors, the correction value acquisition program of the computer 110 computes a correction vector of each pixel row, on an individual lattice point basis (S207 of FIG. 16). In other words, the correction value acquisition program of the computer 110 computes correction vectors of individual lattice points, for each of the first through twenty-fourth pixel rows.

Figure 20:
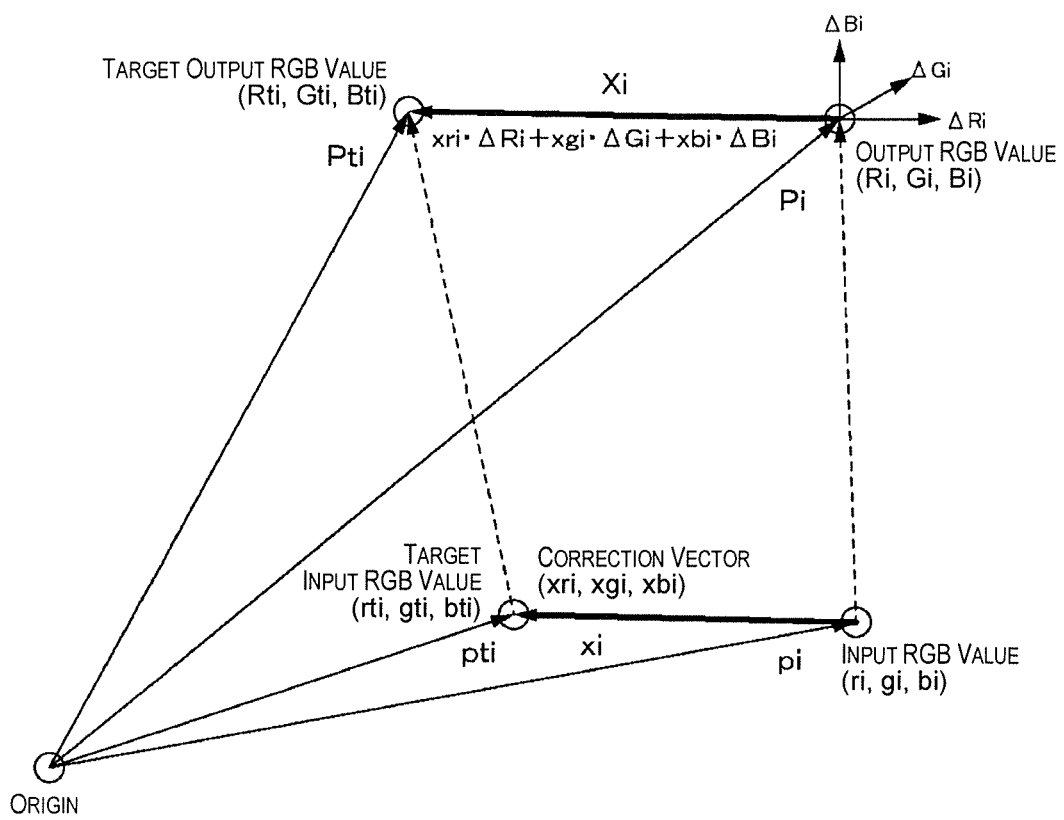
FIG. 20 is an illustration of a correction vector of a lattice point Pi.

FIG. 20 is an illustration of a correction vector of a lattice point Pi. The correction vector is a vector quantity for correcting an input RGB value such that the output RGB value assumes a target value.

In the following discussion, target values for output RGB values are termed "target output RGB values." Here, the output target RGB value of a lattice point Pi is the average value of the 24 output RGB values obtained from the i-th correction pattern, and is represented as a vector quantity (Rti, Gti, Bti). Input RGB values that give target RGB values as output RGB values are termed "target input RGB values." Here, a target input RGB value is represented as (rti, gti, bti). Additionally, (Rti, Gti, Bti)=Pi(rti, gti, bti). Where the input RGB value is (rti, gti, bti), the output RGB value of the input RGB value is (Rti, Gti, Bti)=Pi(rti, gti, bti).

In this case, the correction vector xi is (rt−ri,gt−gi,bt−bi)= (xri, xgi, xbi).

As shown in the drawing, where output RGB values are represented by a vector Pi, and target output RGB values are represented by a vector Pti, the correction vector can be expressed by the following equation using the output RGB value and the target output RGB value.

$$Pti - Pi = xri \cdot \Delta R + xgi \cdot \Delta Gi + xbi \cdot \Delta Bi$$

Here, the unit vectors of the lattice point Pi are respectively $\Delta R=(Rri, Rgi, Rbi)$, $\Delta G=(Gri, Ggi, Gbi)$, $\Delta B=(Bri, Bgi, Bbi)$. Thus, the correction vector can be computed as in the following equation.

$$\begin{pmatrix} Rti - Ri \\ Gti - Gi \\ Bti - Bi \end{pmatrix} = xri \cdot \begin{pmatrix} Rri \\ Rgi \\ Rbi \end{pmatrix} + xgi \cdot \begin{pmatrix} Gri \\ Ggi \\ Gbi \end{pmatrix} + xbi \cdot \begin{pmatrix} Bri \\ Bgi \\ Bbi \end{pmatrix} \quad \text{Equation 1}$$

-continued $$\begin{pmatrix} Rti - Ri \\ Gti - Gi \\ Bti - Bi \end{pmatrix} = \begin{pmatrix} Rri & Gri & Bri \\ Rgi & Ggi & Bgi \\ Rbi & Gbi & Bbi \end{pmatrix} (xri \; xgi \; xbi)$$ Equation 2

$$(xri \; xgi \; xbi) = \begin{pmatrix} Rti - Ri \\ Gti - Gi \\ Bti - Bi \end{pmatrix} \begin{pmatrix} Rri & Gri & Bri \\ Rgi & Ggi & Bgi \\ Rbi & Gbi & Bbi \end{pmatrix}^{-1}$$ Equation 3

In the manner shown above, the correction value acquisition program of the computer 110 computes a correction vector of each pixel row, on an individual correction pattern (individual lattice point) basis. In other words, the correction value acquisition program of the computer 110 computes correction vectors on an individual correction pattern (individual lattice point) basis, for each of the first through twenty-fourth pixel rows. Specifically, the respective correction vectors are associated with pixel rows and with correction patterns (lattice points) and computed as mixed-color unevenness correction values.

The first correction pattern for white color having the input RGB value (255, 255, 255) does not entail ejection of ink, and therefore the correction vector x1 corresponding to the first correction pattern is x1=(0, 0, 0). A condition in which no ink is ejected is considered to most closely approximate white color.

Next, the correction value acquisition program of the computer 110 sends to the printer 1 the correction vectors which serve as the mixed-color unevenness correction values, and these correction vectors are stored in the memory 61 of the printer 1 (FIG. 7C, S208 of FIG. 16). After the mixed-color unevenness correction values have been stored in the memory 61 in this way, the printer 1 is packaged and shipped from the factory.

Mixed-Color Unevenness Correction Process

The user who has purchased the printer 1 installs onto his or her own computer the printer driver which is included on CD-ROM in the same package with the printer 1 (or a printer driver that has been downloaded from the website of the printer manufacturer). The user also connects the computer to the printer 1. At this point, the printer driver acquires from the printer 1 the correction vectors which are stored in the memory 61 of the printer 1.

Figure 6C:
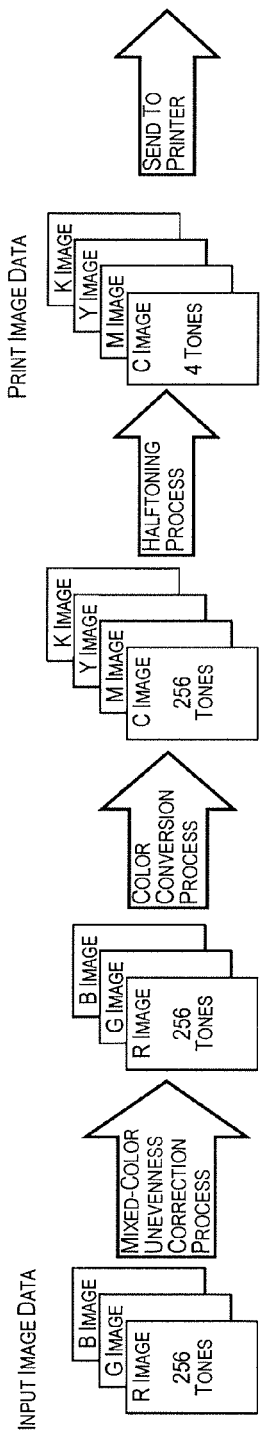
FIG. 6C is an illustration of a mixed-color unevenness correction process.

FIG. 6C is an illustration of the mixed-color unevenness correction process. In the mixed-color unevenness correction process, the RGB color space image data prior to the color conversion process is corrected. Subsequent to the mixed-color unevenness correction process, the printer driver simply generates print image data by carrying out the usual color conversion process/halftoning process on the image data that has undergone the mixed-color unevenness correction process (256-tone RGB color space image data).

Figure 21:
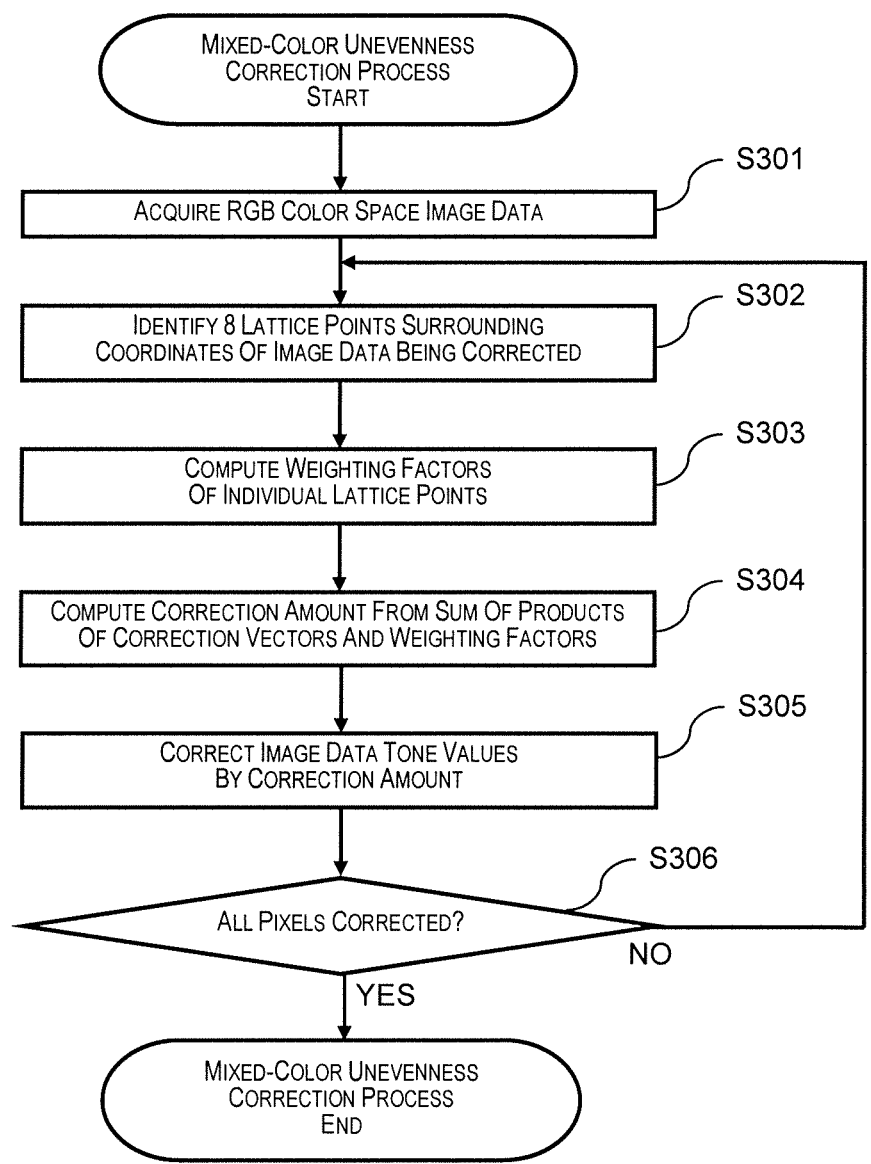
FIG. 21 is a flowchart of a mixed-color unevenness correction process.

FIG. 21 is a flowchart of the mixed-color unevenness correction process. First, the printer driver acquires the 256-tone RGB color space image data (input image data) (S301). Next, the printer driver identifies eight lattice points surrounding the coordinates that indicate the pixel data being corrected (S302). For example, if the tone value of the pixel data being corrected is (200, 200, 200), eight points, namely, the lattice points P1, P2, P4, P5, P10, P11, P13, and P14 are identified as the lattice points.

Next, the printer driver computes a weighting factor for each lattice point (S303). As discussed below, weighting factors are computed on the basis of the distance between the coordinates of the pixel data being corrected and the lattice points.

Figure 22:
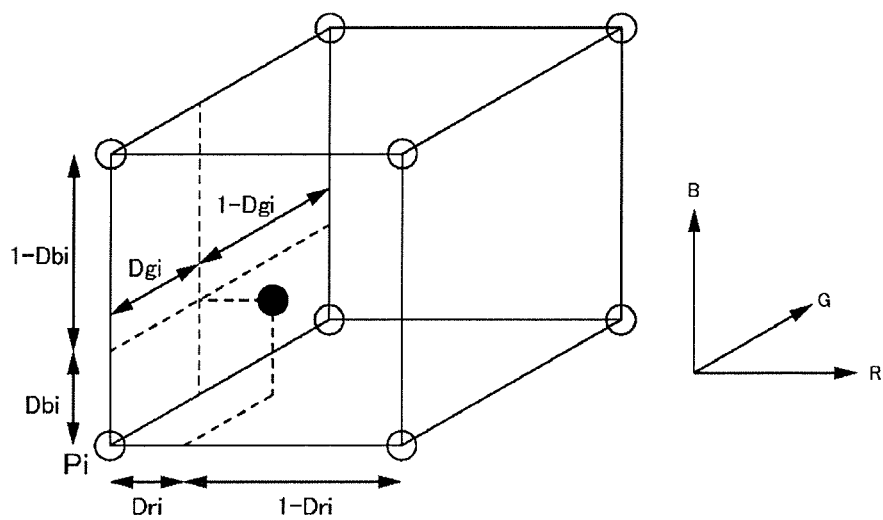
FIG. 22 is an illustration of a weighting factor.

FIG. 22 is an illustration of a weighting factor. The black circle in the drawing indicates the coordinates of pixel data to be corrected. The white circles in the drawing indicate coordinates of lattice points. Where one side of a regular hexahedron defined by the eight lattice points is normalized to 1, the distance between the coordinates of the pixel data being corrected and a lattice point Pi in the R axis direction is denoted as Dri, the distance in the G axis direction is denoted as Dgi, and the distance in the B axis direction is denoted as Dbi. At this point, the weighting factor for the lattice point Pi is derived as shown by the equation below.

$$Wi=(1-Dri)*(1-Dgi)*(1-Dbi)$$

For example, if the tone value of the pixel data being corrected is (200, 200, 200), the normalized distance (Dri, Dgi, Dbi) and the weighting factor Wi are derived as follows.

$$(Dri,Dgi,Dbi)=((200-128)/(255-128),(255-200)/(255-128),$$

$$(255-200)/(255-128))=(0.567,0.433,0.433)$$

$$W2=(1-567)*(1-0.433)*(1-0.433)=0.1392$$

Next, the printer driver computes a correction amount for the pixel data being corrected (S304 of FIG. 21). The printer driver computes the respective products of the correction vector and the weighting factor for each of the eight lattice points, and computes the sum total of these eight products as the correction amount (xr, xg, xb). As shall be apparent, if the pixel data being corrected belongs to the j-th pixel row, the correction amount (xr_j, xg_j, xb_j) is computed on the basis of the correction vector associated with the j-th pixel row.

On the basis of the correction amount computed in this manner, the printer driver then corrects the tone value of the pixel data being corrected (S305). Specifically, the printer driver adds the correction amount (xr, xg, xb) to the pixel data (r, g, b) being corrected, in order to compute corrected pixel data (r+xr, g+xg, B+xb).

The printer driver carries out the process of S302 to S305 above for all pixels of the input image data (S306 of FIG. 21). The mixed-color unevenness correction process is brought to completion thereby.

Subsequent to the mixed-color unevenness correction process, the image data is 256-tone RGB color space data.

Subsequent to the mixed-color unevenness correction process, the printer driver performs the color conversion process/halftoning process in the usual manner, and sends the print image data to the printer 1 (see FIG. 6C). Here, the halftoning process and the print data transmission process are comparable to those in the first reference example.

In the present embodiment, the correction vectors and the correction quantities are derived on the basis of correction patterns which are composed of a plurality of superimposed colors as shown in FIG. 15, and therefore density unevenness (mixed color unevenness) of printed images composed of a plurality of superimposed colors can be corrected. For example, tone values of image data belonging to pixel rows that correspond to row areas susceptible to blue-tinged appearance may be corrected to yellow beforehand. Conversely, tone values of image data belonging to pixel rows that correspond to row areas susceptible to yellow-tinged appearance may be corrected to blue beforehand.

Additional Embodiment

The mixed-color unevenness correction process of the embodiment described above may be employed concomitantly with the single-color unevenness correction process of the second reference example. In this case, the two correction methods may be employed concomitantly in the following manner.

Figure 23:
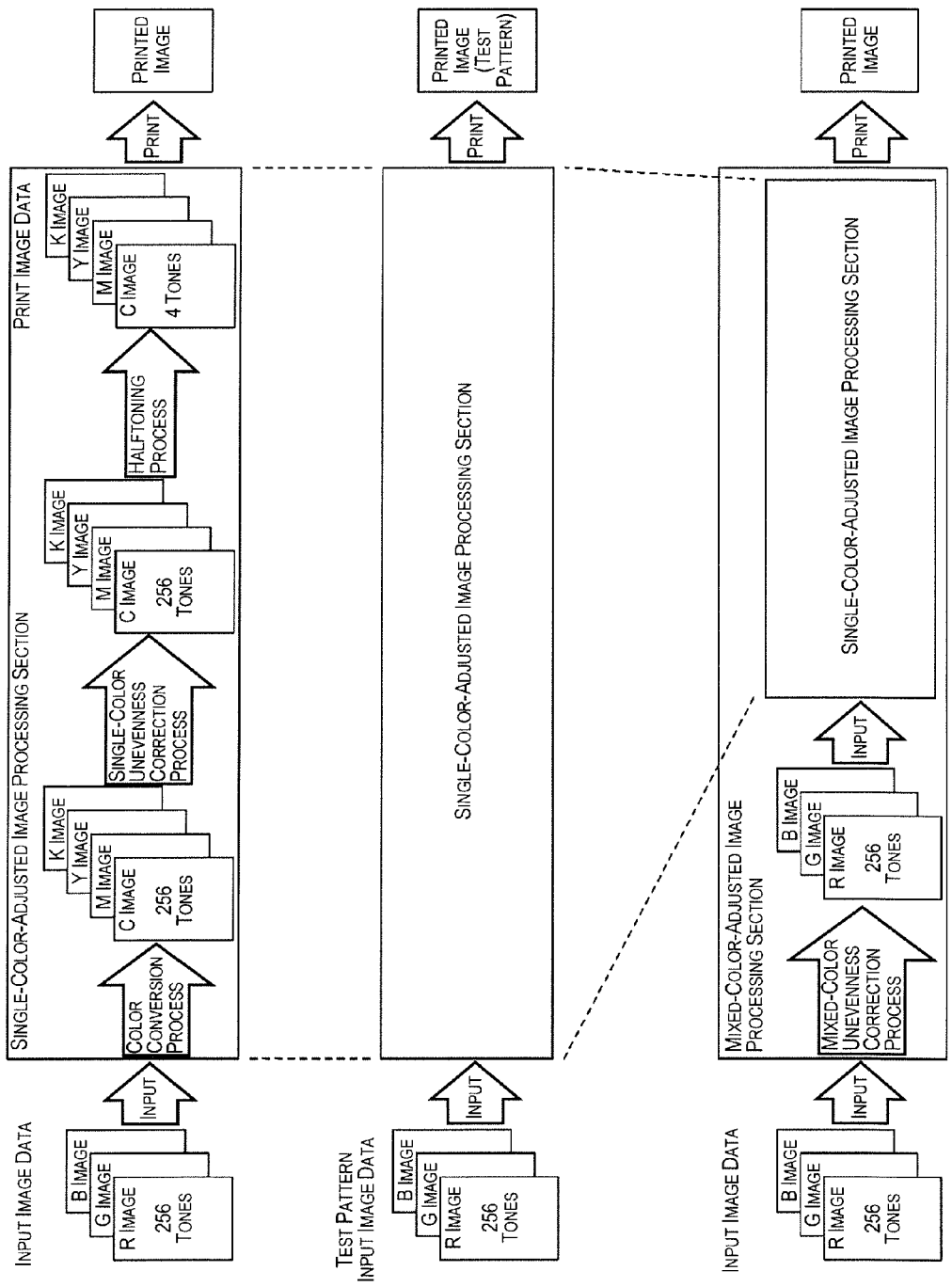
FIG. 23 is an illustration of an image processing section concomitantly employing two correction processes; wherein the upper level is an illustration of a printer driver adapted to carry out the single-color unevenness correction process of the second reference example; the middle level is an illustration of a mixed-color unevenness correction value acquisition process; and the lower level is an illustration of a mixed-color unevenness correction process.

FIG. 23 is an illustration of an image processing section concomitantly employing the two correction processes.

The upper level in FIG. 23 is an illustration of a printer driver adapted to carry out the single-color unevenness correction process of the second reference example. It may be contemplated to provide this printer driver with a single-color-adjusted image processing section. When 256-tone RGB color space data is input, the single-color-adjusted image processing section carries out the color conversion process, the single-color unevenness correction process, and the halftoning process to generate print image data, and prints the image onto a medium. Here, the single-color unevenness correction value acquisition process of the second reference example discussed above takes place prior to carrying out the mixed-color unevenness correction process.

The middle level in FIG. 23 is an illustration of the mixed-color unevenness correction value acquisition process. Here, the aforementioned mixed-color unevenness correction value acquisition process takes place after the single-color unevenness correction value acquisition process has taken place. The correction value acquisition program prompts the single-color-adjusted image processing section to input image data of a mixed-color unevenness correction test pattern (FIGS. 18A and 18B) in order to print out the test pattern (S201, S202 of FIG. 16). Specifically, by inputting the image data of the mixed-color unevenness correction test pattern to the single-color-adjusted image processing section, the color conversion process, the single-color unevenness correction process, and the halftoning process are carried out on the image data of the test pattern, and the mixed-color unevenness correction test pattern is printed onto the medium. In the printed test pattern (print image), density unevenness has been suppressed through the single-color unevenness correction process, but mixed color unevenness has occurred due to superimposition of multiple colors.

By a procedure analogous to the process of S203 to S08 described previously, correction vectors are acquired, and the correction vectors are stored in the memory 61 of the printer 1. Specifically, the printed test pattern (print image) is scanned with a scanner in order to acquire scanned image data, and based on this scanned image data, output RGB values and correction vectors of each of the pixel rows are computed on an individual correction pattern (individual lattice point) basis, and the correction vectors are stored in the printer 1.

The lower level in FIG. 23 is an illustration of the mixed-color unevenness correction process. Once the user's computer acquires the correction vectors that are stored in the memory 61 of the printer 1, the printer driver assumes a configuration furnished with a mixed-color-adjusted image processing section. This mixed-color-adjusted image processing section has the single-color-adjusted image processing section discussed earlier; when 256-tone RGB color space image data is input, the former section carries out the mixed-color unevenness correction process discussed earlier, and inputs the image data from the mixed-color unevenness correction process to the single-color-adjusted image processing section. In the printed image that has been printed in this way, mixed color unevenness is suppressed.

According to the present embodiment, the single-color unevenness correction process is carried out on the image data that has undergone the mixed-color unevenness correction process (see the lower level of FIG. 23). By so doing, the mixed-color unevenness correction process and the single-color unevenness correction process may be carried out independently of one another, and the respective types of unevenness can be corrected accurately.

Moreover, according to the present embodiment, the single-color unevenness correction value acquisition process is carried out prior to carrying out the mixed-color unevenness correction value acquisition process, and the single-color unevenness correction process is carried out when printing the mixed-color unevenness correction test pattern. By so doing, the mixed-color unevenness correction test pattern can be printed out in a condition of suppressed single color unevenness. As a result, the correction vectors do not include a component for correcting single color unevenness, and the correction vectors may be correction values adapted to correct mixed color unevenness caused by multiple superimposed colors. Therefore, mixed color unevenness can be corrected with good accuracy.

Other Embodiments

The embodiments described above are provided for ease of understanding of the present invention, and should not be construed as limiting the invention. Various modifications and improvements of the present invention are possible without departing from the scope thereof, and the invention will be understood to include these equivalents.

In Relation to Pixel Rows, Raster Lines

According to the embodiment described above, an image is composed of 24 juxtaposed pixel rows, and a printed image is composed of 24 juxtaposed raster lines. However, the numbers thereof have been reduced for the purpose of simplicity of description, and in actual practice the number of pixel rows and raster lines is naturally much larger.

Also, according to the embodiment described above, the mixed-color unevenness correction process is carried out on all of the pixel rows; however, optionally, the mixed-color unevenness correction process may be carried out on only some of the pixel rows. For example, in the configuration of FIG. 5, because unevenness is prone to occur in proximity to the twelfth raster line and the thirteenth raster line where the heads 42 join together, the mixed-color unevenness correction process may be carried out on the eleventh to fourteenth pixel rows only.

Where the head group 41 is composed of a plurality of heads as shown in FIG. 4, there may be instances in which unevenness occurs exclusively in areas printed by a particular head. In such cases, the mixed-color unevenness correction process may be carried out on only on pixel rows that correspond to the head giving rise to unevenness.

Regarding the Line Printer

The printer 1 described above is a so-called line printer in which the medium is fed with respect to a stationary head, and rows of dots are formed in the feed direction on the medium. However, the printer 1 is not limited to a line printer. For example, a printer that has a head disposed on a carriage adapted to move in a main scanning direction, and that repeats in alternating fashion a dot-forming operation of ejecting ink from the head while in motion to form dot rows along the main scanning direction, and a feed operation of feeding the medium (a so-called serial printer) is acceptable as well.

In the case of such a serial printer, it is possible to form dot rows at intervals that are smaller than the nozzle pitch. Specifically, it is possible to increase the print resolution to above the nozzle pitch. Therefore, the resolution of the aforementioned image data need not be the same as the nozzle pitch, and may be a higher resolution than the nozzle pitch.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of unevenness of the modified term such that the end result is not significantly changed. For example, these terms can be construed as including a unevenness of at least ±5% of the modified term if this unevenness would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing method comprising:
   carrying out a color conversion process whereby image data of a first color space configured using a plurality of juxtaposed pixel rows made of a plurality of pixels lined up in a prescribed direction, the image data being of first tone values more numerous than tones reproducible by a printing device, is converted into image data of the first tone values of a second color space that corresponds to ink colors of the printing device;
   carrying out a halftoning process for converting image data of the first tone values subsequent to the color conversion process into image data of second tone values that are tones capable of being reproduced by the printing device;
   forming dot rows on a medium on the basis of a plurality of pixel data values in the pixel rows of the image data subsequent to the halftoning process, thereby prompting the printing device, on the basis of the image data, to form a plurality of juxtaposed dot rows and form a printed image on the medium; and
   prior to the carrying out of the color conversion process and the halftoning process,
      associating, on an individual pixel row basis, a correction vector indicating a correction amount in the first color space for each of a plurality of reference colors located at prescribed coordinates in the first color space, and
   carrying out a correction process for each pixel datum of image data of the first tone values of the first color space prior to the color conversion process, on the basis of the correction vector that has been associated with the pixel row to which a given pixel belongs, the correction vector also being associated with the reference color of a location surrounding the coordinates indicating the pixel data in the first color space so that the color conversion process and the halftoning process are carried out on image data configured from the pixel data that has been subjected to the correction process.

2. The printing method according to claim 1, further comprising
   forming a printed image of a test pattern on a medium on the basis of image data of the first tone values of the first color space of the test pattern, the test pattern being made of a plurality of correction patterns that respectively correspond to the plurality of reference colors,
   scanning the printed image of the test pattern, whereby scanned image data of the first color space is acquired, and
   acquiring the correction vectors on an individual pixel row basis for each of the plurality of reference colors, based on the scanned image data.

3. The printing method according to claim 2, further comprising
   during computation of the correction vectors on an individual pixel row basis for each of the plurality of reference colors based on the scanned image data,
      computing output tone values of the first color space for each of the plurality of reference colors on an individual pixel row basis,
      computing, based on the output tone value, an amount of change in the output tone value, observed when an input tone value corresponding to the reference color has changed by a unit amount, and
      computing as the correction vector, based on the amount of change, a correction amount to the input tone value, such that the output tone value with respect to the input tone value becomes a target value.

4. The printing method according to claim 1, further comprising
   associating a correction value for the individual ink colors on an individual pixel row basis,
   carrying out a single-color correction process on each pixel datum of image data of the first tone values in the second color space subsequent to the color conversion process, for each of the individual ink colors, on the basis of the correction value associated with the pixel row to which the given pixel belongs, and
   carrying out the halftoning process on image data of the first tone values in the second color space subsequent to the single-color correction process.

5. The printing method according to claim 4, further comprising
   (A) prior to acquisition of the correction vectors, printing onto a medium a single-color correction process test pattern made of a plurality of correction patterns respectively corresponding to the ink colors,
      scanning the printed image of the single-color correction process test pattern, whereby scanned image data is acquired, computing, on the basis of the scanned data of the single-color correction process test pattern, a density of each of the pixel rows, and acquiring the correction values for single-color correction on the basis of the density computed for each of the pixel rows, (B) after the correction values for said single-color correction have been acquired, carrying out the color conversion process, the single-color correction process, and the halftoning process on image data of the first tone values of the first color space of a test pattern made of a plurality of correction patterns respectively corresponding to the plurality of reference colors, forming a printed image of the test pattern on a medium, scanning the printed image of the test pattern, whereby scanned image data of the first color space is acquired, and acquiring the correction vectors on the basis of the scanned image data, and (C) after the correction vectors have been acquired, carrying out the correction process based on the correction vectors, on image data of first tone values of the first color space of the image to be printed out, and carrying out the color conversion process and the halftoning process on image data configured from the pixel data that has been subjected to the correction process.

6. A non-transitory computer readable medium having stored thereon a computer program which is executable by a computer comprising a printing control device for controlling a printing device, the computer program controls the computer to execute function of:

performing a color conversion process whereby image data of a first color space configured using a plurality of juxtaposed pixel rows made of a plurality of pixels lined up in a prescribed direction, the image data being of first tone values more numerous than tones reproducible by the printing device, is converted into image data of the first tone values of a second color space that corresponds to ink colors of the printing device;

carrying out a halftoning process for converting image data of the first tone values subsequent to the color conversion process into image data of second tone values that are tones capable of being reproduced by the printing device;

forming dot rows on a medium on the basis of a plurality of pixel data values in the pixel rows of the image data subsequent to the halftoning process, thereby prompting the printing device, on the basis of the image data, to form a plurality of juxtaposed dot rows and form a printed image on the medium; and prior to the carrying out of the color conversion process and the halftoning process, associating, on an individual pixel row basis, a correction vector indicating a correction amount in the first color space for each of a plurality of reference colors located at prescribed coordinates in the first color space, and carrying out a correction process for each pixel datum of image data of the first tone values of the first color space prior to the color conversion process, on the basis of the correction vector that has been associated with the pixel row to which a given pixel belongs, the correction vector also being associated with the reference color of a location surrounding the coordinates indicating the pixel data in the first color space so that the color conversion process and the halftoning process are carried out on image data configured from the pixel data that has been subjected to the correction process.

* * * * *